(12) United States Patent
Levin et al.

(10) Patent No.: US 10,913,517 B1
(45) Date of Patent: Feb. 9, 2021

(54) BOAT CHAIR CONFIGURED FOR COVERSION BETWEEN MULTIPLE USE AND STORAGE POSITIONS, A FREESTANDING STAND FOR A BOAT CHAIR, A COMBINATION BOAT CHAIR AND BOAT, AND/OR A METHOD OF USE THEREOF

(71) Applicants: Eric Martin Levin, Severna Park, MD (US); Rick Dries, Roseville, MI (US)

(72) Inventors: Eric Martin Levin, Severna Park, MD (US); Rick Dries, Roseville, MI (US)

( * ) Notice: Subject to any disclaimer, the term of this patent is extended or adjusted under 35 U.S.C. 154(b) by 0 days.

(21) Appl. No.: 16/411,885

(22) Filed: May 14, 2019

(51) Int. Cl.
*B63B 5/06* (2006.01)
*B63B 19/14* (2006.01)
*B63B 29/04* (2006.01)
*F16B 12/44* (2006.01)
*F16B 12/40* (2006.01)

(52) U.S. Cl.
CPC .............. *B63B 29/04* (2013.01); *F16B 12/40* (2013.01); *F16B 12/44* (2013.01); *B63B 2029/043* (2013.01); *F16B 2012/403* (2013.01)

(58) Field of Classification Search
CPC ..... B63B 29/04; B63B 2029/043; B60N 2/20; A47C 1/03; A47C 7/54; A47C 7/543; A47C 7/546
See application file for complete search history.

(56) References Cited

U.S. PATENT DOCUMENTS

| | | | | |
|---|---|---|---|---|
| 4,709,649 A | * | 12/1987 | Wann | B63B 29/04 114/363 |
| 4,745,704 A | * | 5/1988 | Schaefer | A45C 5/00 297/188.12 |
| 4,887,379 A | * | 12/1989 | Harrison | A01K 97/06 43/54.1 |
| 4,926,783 A | | 5/1990 | Lathers | |
| 4,995,669 A | * | 2/1991 | Croft | B60N 2/20 297/367 R |
| 5,171,063 A | * | 12/1992 | Stidd | B60N 2/0717 297/344.1 |
| 5,352,015 A | * | 10/1994 | Morgan | A47B 3/04 297/463.1 |
| 5,385,323 A | * | 1/1995 | Garelick | A47C 3/28 248/157 |
| 5,481,822 A | * | 1/1996 | Engels | A01K 97/06 297/188.12 |
| 5,697,318 A | | 12/1997 | Kobayashi | |
| 5,795,017 A | * | 8/1998 | Zimmerman | B63B 29/04 297/15 |

(Continued)

*Primary Examiner* — Shin H Kim
(74) *Attorney, Agent, or Firm* — Garoia-Zamor Intellectual Property Law, LLC; Ruy Garoa-Zamor

(57) ABSTRACT

A boat chair configured such that it may be converted between several storage and/or use configurations and may be detachably affixed to and removed from a boat or placed on a boat using a free-standing stand. The boat chair may be configured such that the boat chair may be used in multiple use positions and may be transitioned into one or more storage configurations to allow for the boat chair to be more easily transported and/or stored. The boat chair may further be configured such that the use configurations may allow for customized position and/or use of the boat chair on a boat, including use of a free-standing stand for the boat chair.

12 Claims, 25 Drawing Sheets

(56) References Cited

U.S. PATENT DOCUMENTS

| | | | |
|---|---|---|---|
| 5,820,221 A * | 10/1998 | Greaves | A47C 3/16 |
| | | | 297/378.14 |
| 6,089,669 A * | 7/2000 | Wilcox | A47C 1/12 |
| | | | 297/378.1 |
| 6,283,059 B1 | 9/2001 | Scully, Jr. | |
| 6,435,614 B1 * | 8/2002 | Gollahon | A01K 97/10 |
| | | | 248/393 |
| 6,513,876 B1 * | 2/2003 | Agler | B60N 2/206 |
| | | | 297/378.12 |
| 6,527,341 B1 | 3/2003 | Martin | |
| 6,742,843 B2 * | 6/2004 | Golynsky | A47C 1/025 |
| | | | 297/363 |
| 6,773,067 B2 * | 8/2004 | Kim | B60N 2/3013 |
| | | | 297/334 |
| 6,880,482 B2 | 4/2005 | Huse | |
| 7,066,548 B2 | 6/2006 | Butler | |
| 7,107,927 B2 | 9/2006 | Hopper | |
| 7,137,351 B2 | 11/2006 | Picou | |
| 7,367,616 B2 | 5/2008 | Summerford | |
| 7,540,561 B2 * | 6/2009 | McWhorter | A45B 11/00 |
| | | | 135/16 |
| 7,647,880 B2 * | 1/2010 | Devine | B63B 29/04 |
| | | | 114/363 |
| 8,256,844 B2 * | 9/2012 | Yamazaki | B60N 2/0705 |
| | | | 297/334 |
| 9,021,975 B1 | 5/2015 | Fodor | |
| 9,403,447 B2 * | 8/2016 | Elton | B60N 2/2352 |
| 10,407,139 B2 * | 9/2019 | Thomason | B63B 29/04 |
| 10,556,645 B1 * | 2/2020 | Levin | B63B 29/04 |
| 2004/0262971 A1 * | 12/2004 | Hentges | B60N 2/0232 |
| | | | 297/378.12 |
| 2005/0179288 A1 * | 8/2005 | Lizaso | B63B 29/04 |
| | | | 297/250.1 |
| 2006/0061183 A1 * | 3/2006 | White | B60N 2/986 |
| | | | 297/378.12 |
| 2009/0188421 A1 * | 7/2009 | Devine | B63B 29/04 |
| | | | 114/363 |
| 2009/0267399 A1 * | 10/2009 | King | B60N 2/20 |
| | | | 297/378.14 |
| 2010/0037814 A1 | 2/2010 | Sahr | |
| 2012/0261964 A1 * | 10/2012 | Yamaguchi | B60N 2/12 |
| | | | 297/378.14 |
| 2013/0200668 A1 * | 8/2013 | Michalak | B60N 2/12 |
| | | | 297/217.1 |
| 2015/0076874 A1 * | 3/2015 | Neese | B63B 17/00 |
| | | | 297/188.08 |
| 2015/0274263 A1 | 10/2015 | Nutz | |

* cited by examiner

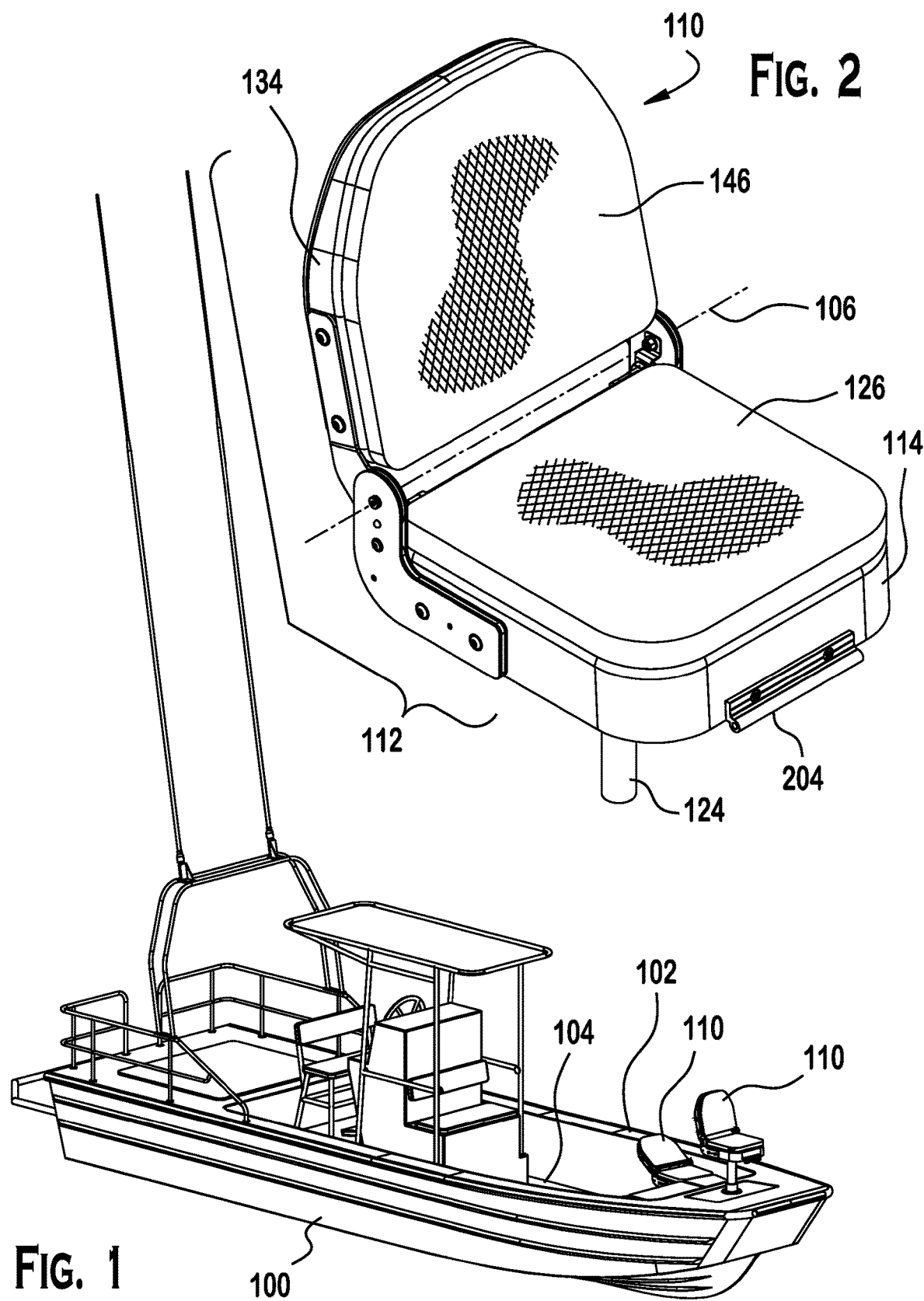

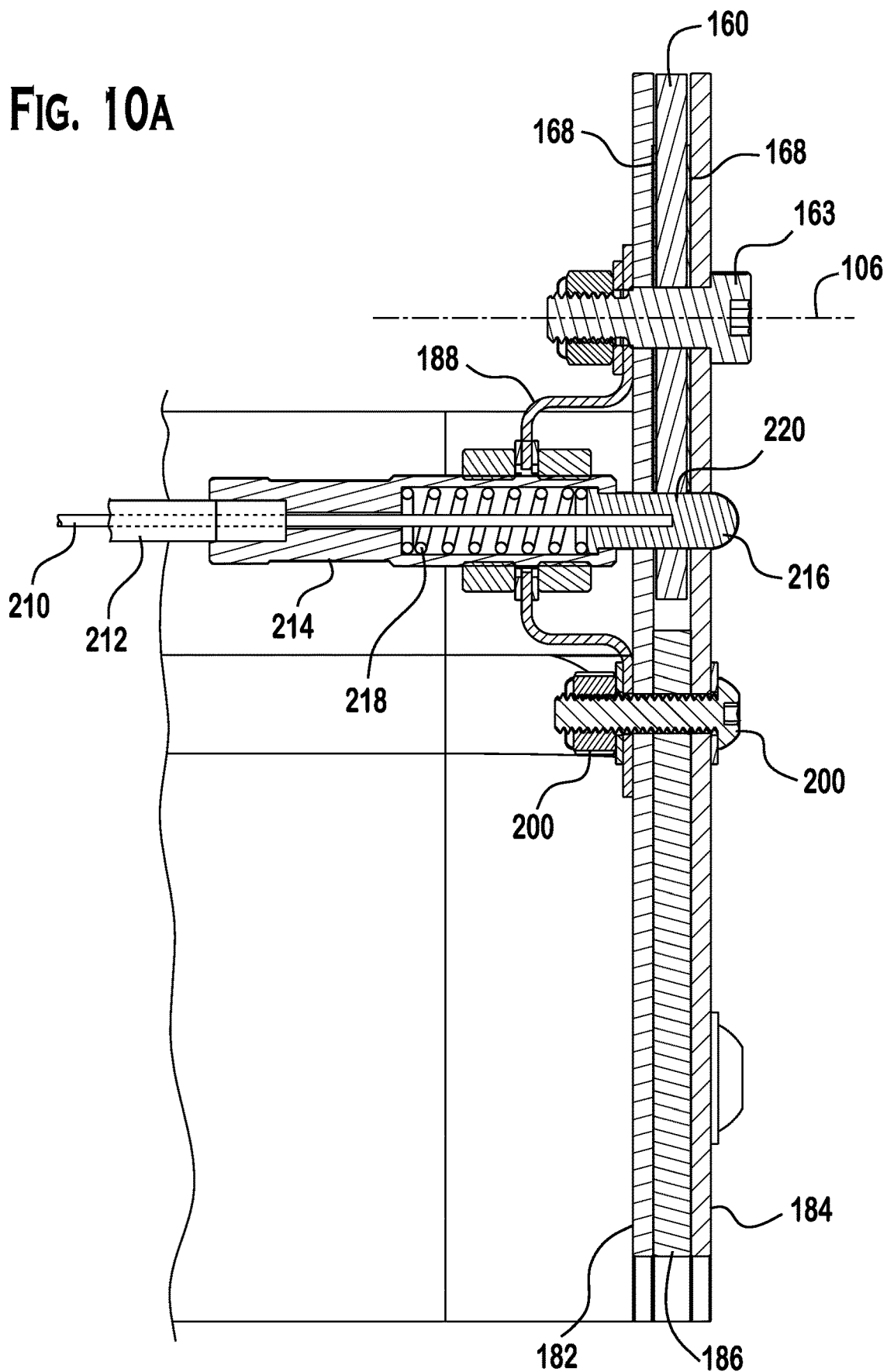

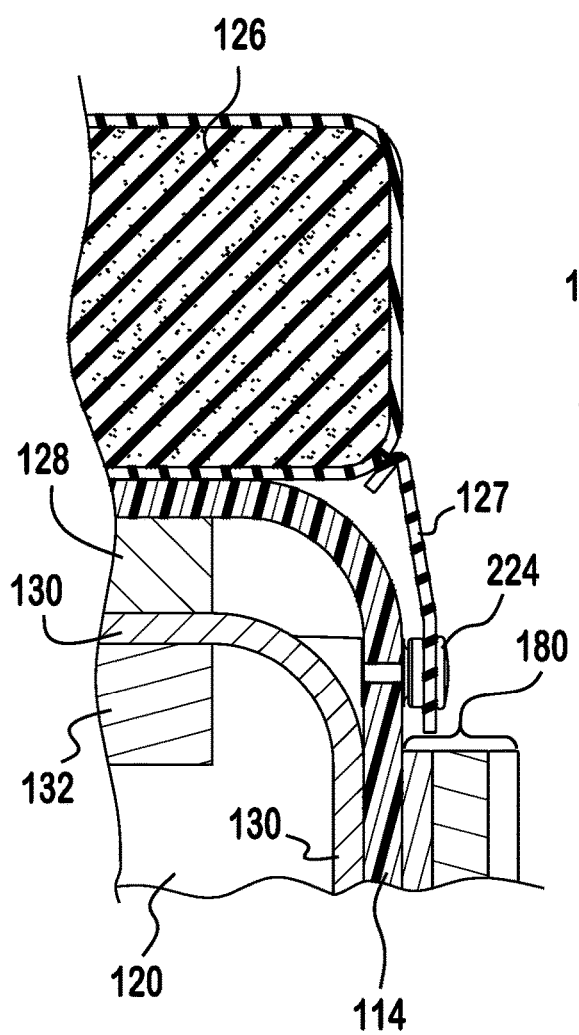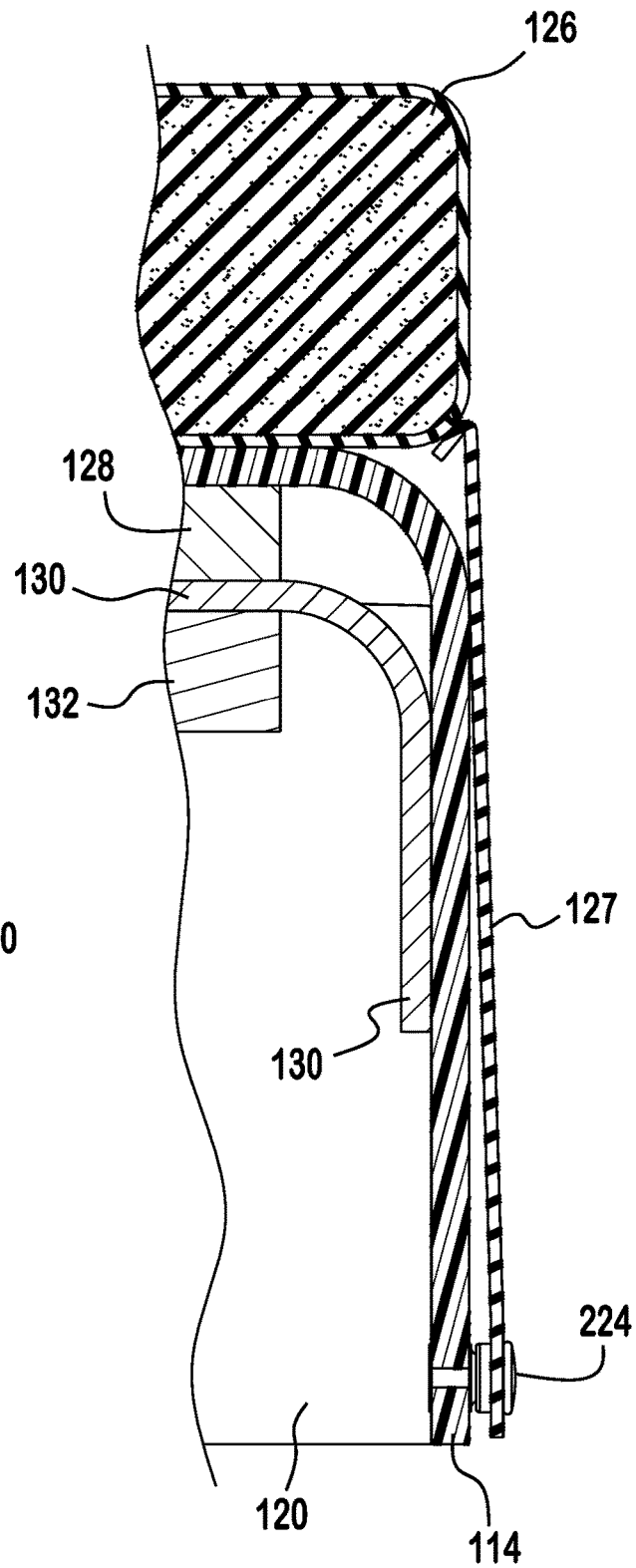
FIG. 12
FIG. 13

BOAT CHAIR CONFIGURED FOR COVERSION BETWEEN MULTIPLE USE AND STORAGE POSITIONS, A FREESTANDING STAND FOR A BOAT CHAIR, A COMBINATION BOAT CHAIR AND BOAT, AND/OR A METHOD OF USE THEREOF

BACKGROUND

The present invention is generally directed to ships and chairs and, more specifically, boat components and attachments and foldable seats. More specifically still, the invention is directed toward boat chairs which may be selectively removed and attached from, or used on a boat, and which may be transitionable between several preferred configurations.

Boat chairs are designed to maintain a single shape. Such configurations may make use difficult, as chairs suitable for use while fishing may be uncomfortable for lounging and sun bathing. The reverse is also true, with chairs designed for lounging and sun bathing being unsuited for fishing, including crabbing, dredging for oysters, and other like tasks. Similarly, some users may need or prefer more vertical usage positions than other users, and boat chairs do not provide multiple positions for the chair to be used in. Boat chairs may also be difficult to store, as the shape of boat chairs is generally not conducive to compact storage.

Additionally, many known boat chairs may include portions which must be stored separately, requiring additional space. Such limitations may restrict the usefulness of boats and require consumers to purchase multiple boats for multiple purposes.

It may be advantageous to provide a boat chair that is at least one of: easily portable; may be converted between multiple storage and/or use configurations; may be selectively and detachably affixed to multiple portions of existing boat structures; may form a compact and easily storable storage configuration; and/or that is efficient to manufacture. It may further be advantageous to provide a boat configured for use with such boat chairs.

SUMMARY

Briefly speaking, one aspect of the present invention is directed to a boat chair that is detachably installable on a boat. The boat chair includes a chair body which is moveable between a first compact configuration, a first open configuration, and a second open configuration, wherein the chair body is configured for sitting upon when in either of the first open configuration and the second open configuration. The chair body includes a back support structure and a seat support structure which are pivotally connected together about an axis of rotation. A retaining pin is disposed on the seat support structure and configured to detachably secure an angular position of the back support structure relative to the seat support structure. The retaining pin may secure the chair body in either of the first compact configuration, the first open configuration, and the second open configuration, wherein the angular position of the back support is different in the second open configuration from the first open configuration. In some aspects, no part of the chair body is formed by a bulkhead structure of the boat, nor boat decking. A post may be detachably engageable with the seat support structure such that the chair body can be detachably installed on the boat.

In a separate aspect, the boat chair includes a seat connector disposed on the seat support structure and configured to engage at least one of (1) the bulkhead structure of the boat, and (2) a fixed connector located on the bulkhead structure of the boat.

In a separate aspect, the back support structure further includes a indexing plate attached thereto, the indexing plate including a first plurality of bores therein configured to receive the retaining pin therein. An actuator housing is disposed on the seat support structure, and the retaining pin is slidably positioned within the actuator housing. The actuator housing has a biasing member disposed therein configured to bias the distal end of the retaining pin to push outward from the actuator housing.

In other aspects, the boat chair includes a yoke or yoke mechanism disposed along the seat support structure and axially displaced along the axis of rotation from the actuator housing. A connector extends from the retaining pin to the yoke such that the retaining pin can be disengaged from the first indexing plate to allow the back support structure to be pivotally moved relative to the seat support structure by operation of the yoke. The yoke is oriented perpendicularly relative to the axis of rotation, while the actuator housing is located parallel to the axis of rotation.

In a separate aspect, the boat chair of claim includes a second actuator housing disposed on the seat support structure with a second retainer pin being slidably positioned within the second actuator housing. A second biasing member is disposed in the second actuator housing configured to bias the distal end of the second pin to push outward from the actuator housing. The back support structure further includes a second indexing plate attached thereto which includes a second plurality of bores therein configured to receive the second retaining pin therein. A second connector extends from the retaining pin to the yoke, at the same point as the connector, such that the second retaining pin can be disengaged from the second indexing plate at the same time the retaining pin is disengaged from the indexing plate, so that the back support structure can be pivotally moved relative to the seat support structure by operation of the yoke. The yoke includes a handle attached to the connector and the second connector such that operation of the handle disengages both the retaining pin and the second retaining pin so that the back support structure can rotate relative to the seat support structure.

In a separate aspect, the seat support structure also includes a pair of sandwich plates with the indexing plate located therebetween. A sandwich spacer is positioned between the pair of sandwich plates. A pair of bushings is also located on each side of the indexing plate and between the pair of sandwiching plates, to allow the indexing plate to rotate. In some aspects, the seat support structure also includes a second pair of sandwich plates with the second indexing plate located therebetween. A second sandwich spacer is positioned between the second pair of sandwich plates. A second pair of bushings is also located on each side of the second indexing plate and between the second pair of sandwiching plates, to allow the second indexing plate to rotate.

In a separate aspect, the present invention is directed to a boat chair and freestanding stand. The boat chair includes a chair body which is moveable between a first compact configuration, a first open configuration, and a second open configuration, wherein the chair body is configured for sitting upon when in either of the first open configuration and the second open configuration. The chair body includes a back support structure and a seat support structure which are pivotally connected together about an axis of rotation. A retaining pin is disposed on the seat support structure and configured to detachably secure an angular position of the back support structure relative to the seat support structure. The retaining pin may secure the chair body in either of the first compact configuration, the first open configuration, and the second open configuration, wherein the angular position of the back support is different in the second open configuration from the first open configuration. No part of the chair body is formed by a bulkhead structure of the boat, nor boat decking. A post may be detachably engageable with the seat support structure such that the chair body can be detachably installed on the boat. The free-standing stand is configured for placement on a flat surface, and has a post receptacle thereon such that the boat chair can be configured for use in any one of the following conditions: (1) to engage the bulkhead structure of the boat, (2) a fixed connector located on the bulkhead structure of the boat, (3) vertically aligned and positioned over the bulkhead structure and/or boat decking via the post, and (4) vertically aligned and positioned from the free-standing stand via the post such that the boat chair is used separate from the boat.

In a separate aspect, the boat chair includes a seat connector disposed on the seat support structure and configured to engage at least one of (1) the bulkhead structure of the boat, and (2) a fixed connector located on the bulkhead structure of the boat. Thus, if a family has two different types of center console boats the family can move the boat chair between boats.

In a separate aspect, the boat chair includes a seat connector disposed on the seat support structure and configured to engage the bulkhead structure of the boat. Thus, if a family has two different types of center console boats the family can move the boat chair between boats.

In a separate aspect, the boat chair includes a seat connector disposed on the seat support structure and configured to engage at least one of a fixed connector located on the bulkhead structure of the boat. Thus, if a family has two different types of center console boats the family can move the boat chair between boats by locating a fixed connector on each type of boat.

In a separate aspect, the boat chair includes a seat connector disposed on the seat support structure and configured to engage at least one of a fixed connector located on the bulkhead structure of the boat. Thus, if a family has two different types of center console boats the family can move the boat chair between boats.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 1 is a front perspective view of a boat 100 configured for use with the boat chair 110. The figure demonstrates the relative position of the boat decking 104 in relation to the bulkhead structure 102 of the boat 100, and shows the mounting mechanisms 108 which may be included on the boat decking 104.

FIG. 2 is a front perspective view of a boat chair 110 with the chair body 112 in a first use position. The chair body 112 comprises a seat support structure 114, with a seat cushion 126 thereon, and a back support structure 134, with a back rest cushion 146 attached thereto. The angle of the back support structure 134 in relation to the seat support structure 114 can change along the axis of rotation 105. The boat char 110 may also include a seat connector 204 and a post 124.

FIG. 10A is a partial cross-sectional view of the boat chair 110 of FIG. 9 as taken along lines 10-10 of FIG. 9, demonstrating adjustment mechanism on the right lateral side of the chair body 112. Preferably, the connector 210 is contained within the connector housing 212, which is itself partially contained within the actuator housing 214, then through the pin biasing spring 218 (also referred to in the claims as "a biasing member") and ending within the retaining pin 220. The figure shows how the distal end of the retaining pin 216 may be pulled inward so that it is fully removed from one of the plurality of bores 162 to allow the indexing plate 160 to turn. The figure also provides an enhanced view of the axis screw 163 which creates the axis of rotation 106 about which the back support structure 134 might pivot relative to the seat support structure 114.

FIG. 12 is a partial cross-sectional view of an alternate embodiment of the boat chair 110 of FIG. 11, wherein the seat cushion 126 includes a cushion skirt 127 that is connected to the seat support structure 114 via snaps 224. The cushion skirt 127 may be short enough to only extend as far as the pair of sandwich plates 180.

FIG. 13 is a partial cross-sectional view of an alternate embodiment of the boat chair 110 of FIG. 12, wherein the seat cushion 126 includes a cushion skirt 127 that is connected to the seat support structure 114 via snaps 224. The cushion skirt 127 may extend so far as to cover the entire periphery of the seat support structure 114.

DETAILED DESCRIPTION OF THE PREFERRED EMBODIMENT

Figure 3:
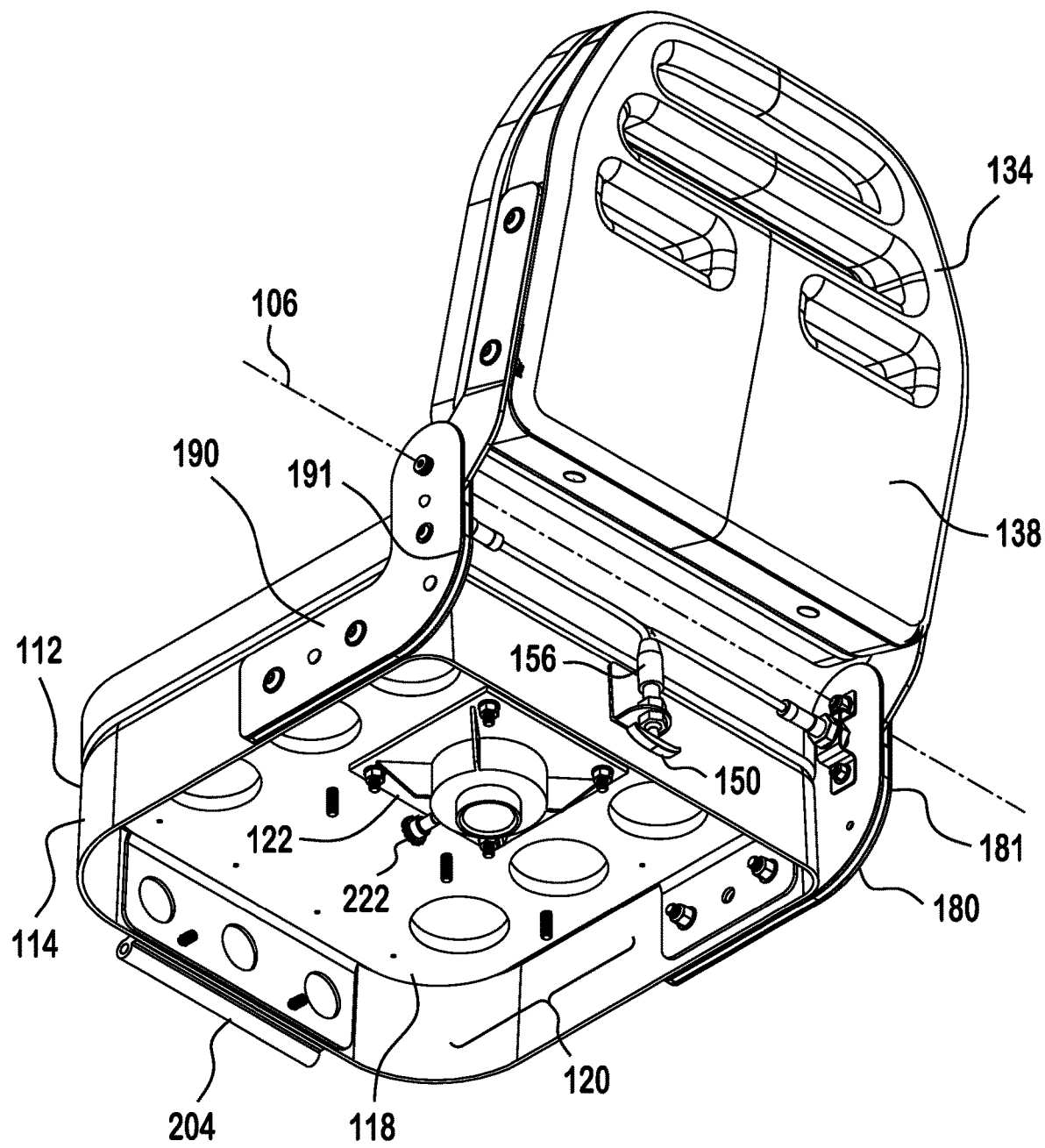
FIG. 3 is a rear perspective view of a boat chair 110 of a preferred embodiment. The figure shows the outer back face 138 of the back support structure 134 and the outer seat face 118 of the seat support structure 114. The outer back face 138 may be formed of the rear support clamshell 145 and may include at least one grip 148. The indexing plate 160 and second indexing plate 170 are preferably affixed to opposing lateral sides of the back support structure 134. The outer seat face 118 may be formed of the pedestal spacer 132 and the pedestal 122 may be attached thereto. The seat support structure 114 may define a cavity 120. The seat support structure 114 may have the seat connector 204 affixed to the outer surface of its front side and a handle bracket 152 attached to the outer surface of its rear side. Specifically, the handle bracket 152 preferably has a mounting face 153 parallel to the outer surface of the rear side of the seat support structure 114 and a handle abutment face 151 roughly perpendicular to the mounting face 153 and extending away from the outer surface of the rear side of the seat support structure 114. A pair of sandwich plates 180 and a second pair of sandwich plates 190 are preferably affixed to the outer lateral sides of the seat support surface 114 and preferably extend outward past the outer surface of the rear side of the seat support structure 114 such that the sandwich plate outer end 181 and second sandwich plate outer end 191 (the farthest extending portion of the pair of sandwich plates 180 and second pair of sandwich plates 190, respectively) extend outward at least as far as the handle abutment face 151 of the handle bracket 152.
Figure 5:
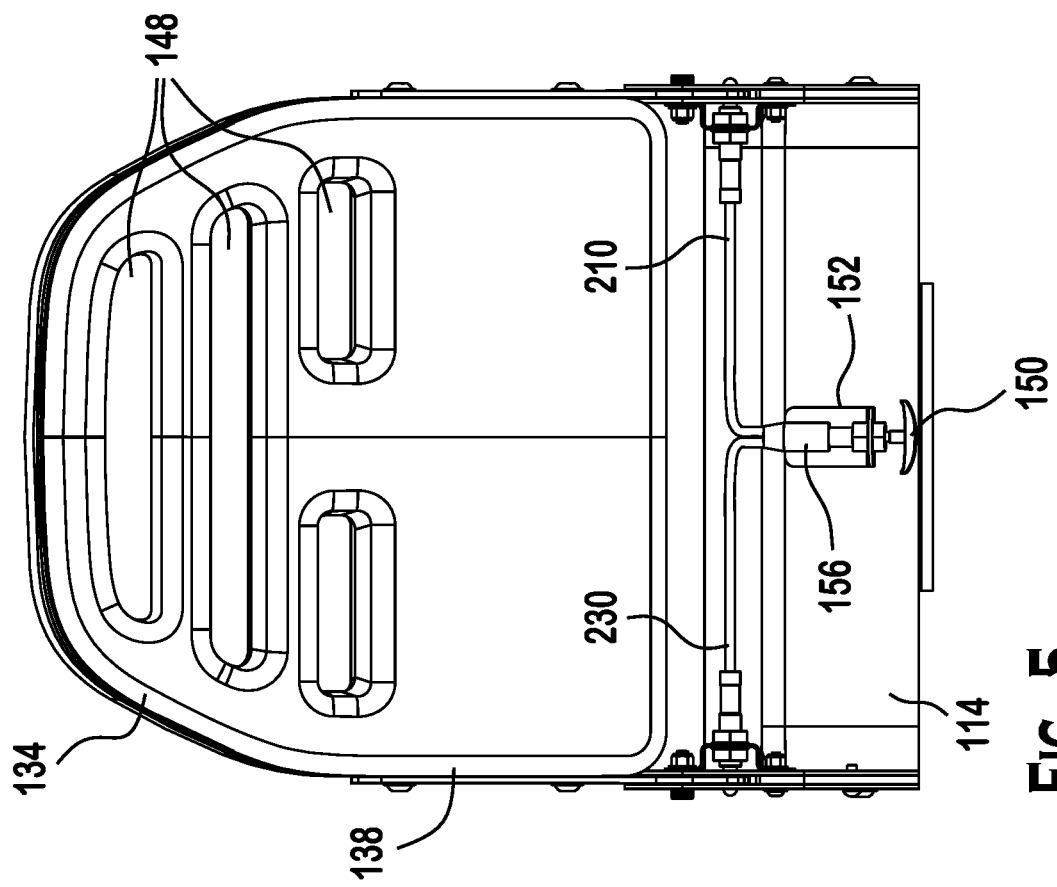
FIG. 5 is a rear elevational view of the boat chair 110 of a preferred embodiment, with the chair body 112 in the first open configuration, further demonstrating the preferred positioning of the handle bracket 152 on the seat support structure 114. The figure also shows the handle 150 which preferably engages handle bracket 152 via fastener 154 and may contact the handle abutment face 151. The handle 150 may be attached to the yoke 156 (also referred to as "the yoke mechanism") and a handle biasing spring 158 may be positioned between the yoke 156 and the fastener 154 to bias the handle 150 downward to keep the connector 210 and/or second connector 230 taut. The connector 210 and second connector 230 preferably meet at the yoke 156.
Figure 4:
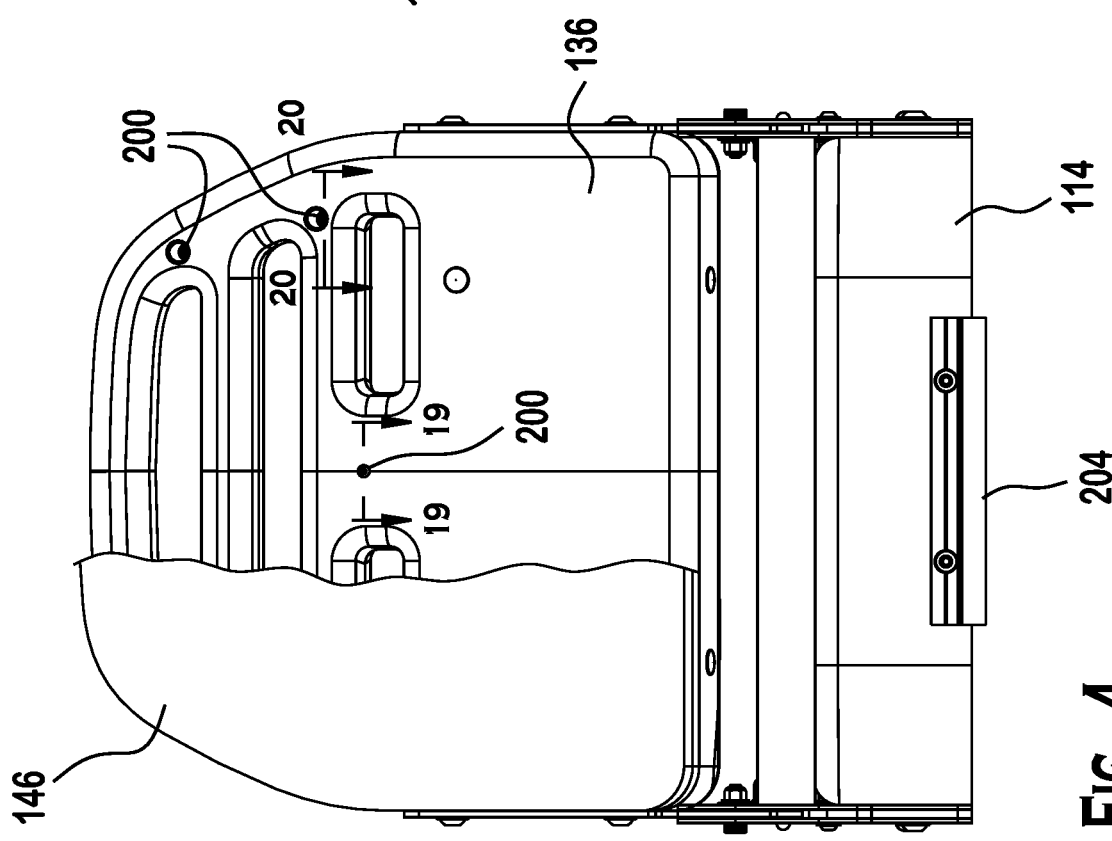
FIG. 4 is a front elevational view of the boat chair 110 of a preferred embodiment, with the chair body 112 in the first open configuration, further demonstrating the preferred positioning of the indexing plate 160 and second indexing plate 170 on opposing lateral sides of the back support structure 134. The figure further shows the preferred positioning of the seat connector 204 on the front side of the seat support structure 114. The seat cushion 126 and the back rest cushion 146 (which is partially broken away in the figure) are preferably positioned on the inner seat face 116 and inner back face 136 respectively, and are preferably detachably affixed to the chair body 112 via a plurality of snaps 224. In some preferred embodiments, the seat cushion 126 and/or the back rest cushion 146 may be detachably affixed to the chair body 112 via hook-and-loop fastener 226.

Certain terminology is used in the following description for convenience only and is not limiting. The words "right," "left," "up," and "down" designate the directions as they would be understood by a person sitting in the boat chair in a first open position. The words "outer" and "inner" refer to directions away from and toward, respectively, the geometric center of the boat chair when it is in a first open position. "Lateral ends" refers to opposite ends of a component along a geometric horizontal axis of the part. The terms "touching" or "contacting" when used in connection with two surfaces is defined as meaning "being positioned anywhere between actual touching of two surfaces to being in facing orientation and within one inch apart." Additionally, the words "a" and "one" are defined as including one or more of the referenced item unless specifically stated otherwise. The terminology includes the words above specifically mentioned, derivatives thereof, and words of similar import.

Referring to FIGS. 1-27, wherein like numerals indicate like elements throughout, there are shown preferred embodiments of a boat chair 110, with the term "boat chair" being understood to mean an article for sitting, resting, or otherwise holding the bodies of humans or animals while on vehicles. While the term "boat chair" is used herein, it is not meant to be limiting, as those of ordinary skill in the art will appreciate from this disclosure that the invention may be used to make tables, chairs, couches, sofas, recliners, seat backs, and more to be used anywhere, including on boats, trains, cars, in homes or public spaces, and the like without exceeding the scope of this disclosure. In embodiments in which a freestanding stand is included, the boat chair is meant to be used anywhere, but the term boat chair is applicable as the primary intended use of the boat chair is on and in connection with various water borne vessels, and the boat chair is intended to be sold via channels of trade closely connected to boats and other water borne vehicles.

In some of the figures, preferred embodiments of the boat chair 110 are shown in connection with a boat 100. Generally speaking, boat may refer to any vessel for use or partial use on water or mud. This may include ships, sailboats, trawlers, catamarans, skiffs, shrimping and fishing vessels, bass boats, deep-sea fishing boats, crabbing and shrimping boats, pontoon boats, hovercrafts, glass bottom boats, yachts, sail boats, and other water borne vehicles. The invention is neither limited to recreational nor commercial watercraft of any kind. The boat 100 may include boat decking 104, understood in the industry to mean the portion of a boat 100 which persons generally walk or stand. The boat 100 may also include a bulkhead structure 102, which may include, but is not limited to, any and all of: raised decking at the bow, stern, or forecastle of the ship; bulwarks, sidewalls, gunwales, and cabin structures; live wells and fishing structures; and other permanent or semi-permanent seating. The boat 100 may also include a boat cushions which may include and all cushions which may temporarily attached, permanently attached, kept, and/or used on a boat.

Generally, the boat chair 110 preferably comprises a chair body 112 which includes a seat support structure 114 and a back support structure 134 joined in a preferred manner such that the back support structure 134 may rotate along an axis of rotation 106 to change its angular position in relation to the seat support structure 114. The chair body 112 refers to the general form of the boat chair 110 that does not include a possible post 124, freestanding stand 250, or mounting mechanism 108 or fixed connector 202 (each of which may be present in or on the boat 100, bulkhead structure 102, or boat decking 104 which form no part of the chair body 112). In some preferred embodiments, the height of the boat chair 110 relative to the boat decking 104 or bulkhead structure 102 of the boat is significant. For example, in many embodiments the height of the top of the seat support structure should be generally horizontally aligned with the adjacent boat decking or boat structure.

It is preferred that no part of the chair body 112 is formed by a bulkhead structure 102 of the boat 100 nor boat decking 104. Rather, it is preferred that the boat chair 110 is connected to the boat 100 through one of, or a combination of, a post 124 that is detachably engageable with the seat support structure 114 such that the chair body 112 can be detachably installed on the boat 100; and/or a seat connectors 204 disposed on the seat support structure 114 and configured to engage at least one of (1) the bulkhead structure 102 of the boat 100, and (2) a fixed connector 202 located on the bulkhead structure 102 of the boat 100. The seat connector 204 engaging the bulkhead structure 102 and/or the fixed connector 202 may provide additional support for a person seated on the boat chair 110, and may assist in preventing the boat chair 110 from pivoting about the post 124 when undesired.

Referring to FIGS. 1-2 and 22-23, the boat chair 110 is preferably detachably installable on a boat 100, as discussed above. It is preferred that the boat chair 110 include a post 124 which is detachably engageable with the seat support structure 114 such that the chair body 112 can be detachably installed on a boat 100. In some preferred embodiments, a mounting mechanism 108 may be included in the boat decking 104 or bulkhead structure 102 of the boat 100 to receive a lower end of the post 122, while the other end of the post 122 may be inserted into the pedestal 122 affixed to the seat support structure 114. A pedestal locking pin 222 may be include to lock the upper end of the post 122 into the pedestal 122.

The mounting mechanism 108 may be a permanent fixture on the boat 100, or may be a temporary addition. For example, in FIG. 1, it can be seen that in some embodiments it is preferred that the post 124 be inserted through a hole in the boat decking 104. The mounting mechanism 108 may comprise a stainless steel or molded plastic ring or cup, which may protect the boat decking 104 from being damaged by the post 124. Alternatively, the mounting mechanism 108 may be a metal footer which may be affixed directly onto the boat decking 104 without requiring a hole be cut out of the boat decking 104.

In other preferred embodiments, one or more fixed connector 202 may be positioned on the bulkhead structure 102 of the boat 100 and configured to connect to the seat connector 204 positioned on the chair body 114. Preferably the chair body 112 would first be connected to the post 124 (itself having already been connected to the mounting mechanism 108 in the boat decking 104) and turned such that the seat connector 204 might slide into fixed connectors 202, locking in place. In this preferred embodiment, the top of the seat cushion 126 is roughly even with a portion of the bulkhead structure of the boat 102 or boat decking 104 once the seat connector 204 is connected to the fixed connectors 202. If a family has two different types of center console boats the family can move the boat chair between boats.

Referring to FIGS. 24-27, in other preferred embodiments the boat chair 110 may not be attached to the boat 100 at all and may instead be placed on the boat decking 104 or other surfaces using a freestanding stand 250. The freestanding stand 250 is preferably formed of an outer frame 248, preferably in a square or round shape, to provide a large footprint for the boat chair 110 to allow for stable use on the ocean or when the boat chair 110 is reclined. The outer frame 248 is preferably formed of hollow or semi-hollow member which may be telescopically connected or connected via outer connectors 256, to allow the size and shape of the outer frame 248 to be adjusted. The outer frame 248 is preferably formed of metal, molded plastic, or PVC piping.

The freestanding stand 250 preferably also includes a stand pedestal 242 for the lower end of the post 124 to be inserted into, while the upper end of the post 124 is inserted into the pedestal 122 and locked therein via a pedestal locking pin 222. A stand pedestal locking pin 244 may be included to secure the post 124 in the stand pedestal 242, thus securing the chair body 112 to the freestanding stand 250. The stand pedestal 242 is positioned on an inner strut 246 preferably bisecting the outer frame 240 proximate to the center of the outer frame 248. The inner strut 246 is preferably formed of metal, molded plastic, or PVC piping. It is further preferred that the freestanding stand 250 be configured such that the stand pedestal 242 is positioned as close to the geometric center of the outer frame 248 as is possible.

In the preferred embodiment, the boat chair 110 may be held to the boat 100 by gravity if any element of the freestanding stand 250 is formed of or includes heavy metal such as cast iron or lead. It is preferred that weighted feet 252 be included, preferably at the corners of the outer framer 248. Wheeled feet 254 maybe be provided to increase portability of the boat chair 110, preferably formed of hard rubber, molded plastic, or metal. Those of ordinary skill in the art will appreciate from this disclosure that any suitable material may be used to form any element of the freestanding stand 250 without exceeding the scope of this disclosure.

To describe the preferred configuration and use of the freestanding stand 250 another way, a preferred embodiment of a combination of one or more preferred embodiments boat chair 110 and the freestanding stand 250 is preferably configured such that the freestanding stand 250 is configured for placement on a flat surface. The freestanding stand 250 preferably has a post receptacle (also referred to as a stand pedestal 242) thereon such that the boat chair 110 can be configured for use in any one of the following conditions: (1) to engage the bulkhead structure 102 of the boat 100, (2) a fixed connector 202 located on the bulkhead structure of the boat 100, (3) vertically aligned and positioned over the bulkhead structure 102 and/or boat decking 104 via the post 124, and (4) vertically aligned and positioned from the freestanding stand 250 via the post 124 such that the boat chair 110 is used separate from the boat 100.

Referring to FIGS. 3-9, 10A, and 21, the boat chair 110 is preferably detachably installable on a boat and includes a chair body 112 which is moveable between a first compact configuration, a first open configuration, a second open configuration, and in some preferred embodiments, a third open configuration. The chair body 112 is configured for sitting upon when in any of the first, second, or third open configurations. The chair body 112 is configured for transportation or storage when in the first compact configuration (as in FIG. 21).

A retaining pin 220 is preferably disposed on the seat support structure 114 to detachably secure an angular position of the back support structure 134 relative to the seat support structure 114 such that the chair body 112 can be secured in any of the first compact configuration, the first open configuration, the second open configuration, and the third open configuration. It should be noted that it is preferred that the angular position of the back support structure 134 is different in the second open configuration from the first open configuration, in the third open configuration from the second open configuration, and in the first open configuration from the third open configuration.

Figure 6:
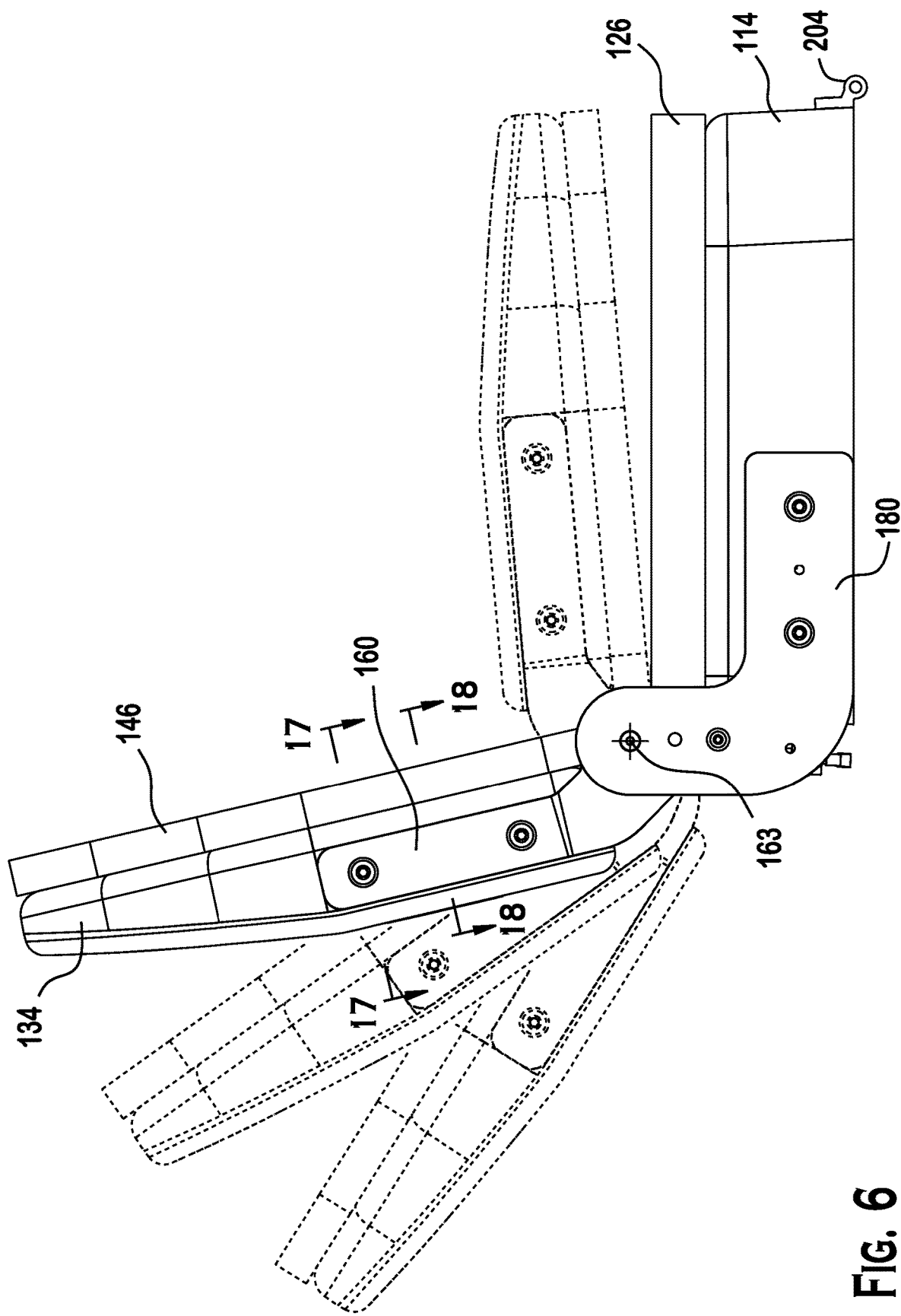
FIG. 6 is right side elevational view of a boat chair 110 of the preferred embodiment, demonstrating the preferred positions of the back support structure 134 relative to the seat support structure 114 as it rotates about an axis of rotation 106. Progressing counter-clockwise from the right side of the figure, the figure shows the chair body 112 in 1.) the first compact configuration; 2.) the first open configuration; 3.) the second open configuration; and a preferred possible 4.) the third open configuration. The axis of rotation 106 is formed by the axis screw 163 (positioned in the axis bore 161) and, in some preferred embodiments, the second axis screw 173 (positioned in the second axis bore 171).
Figure 7:
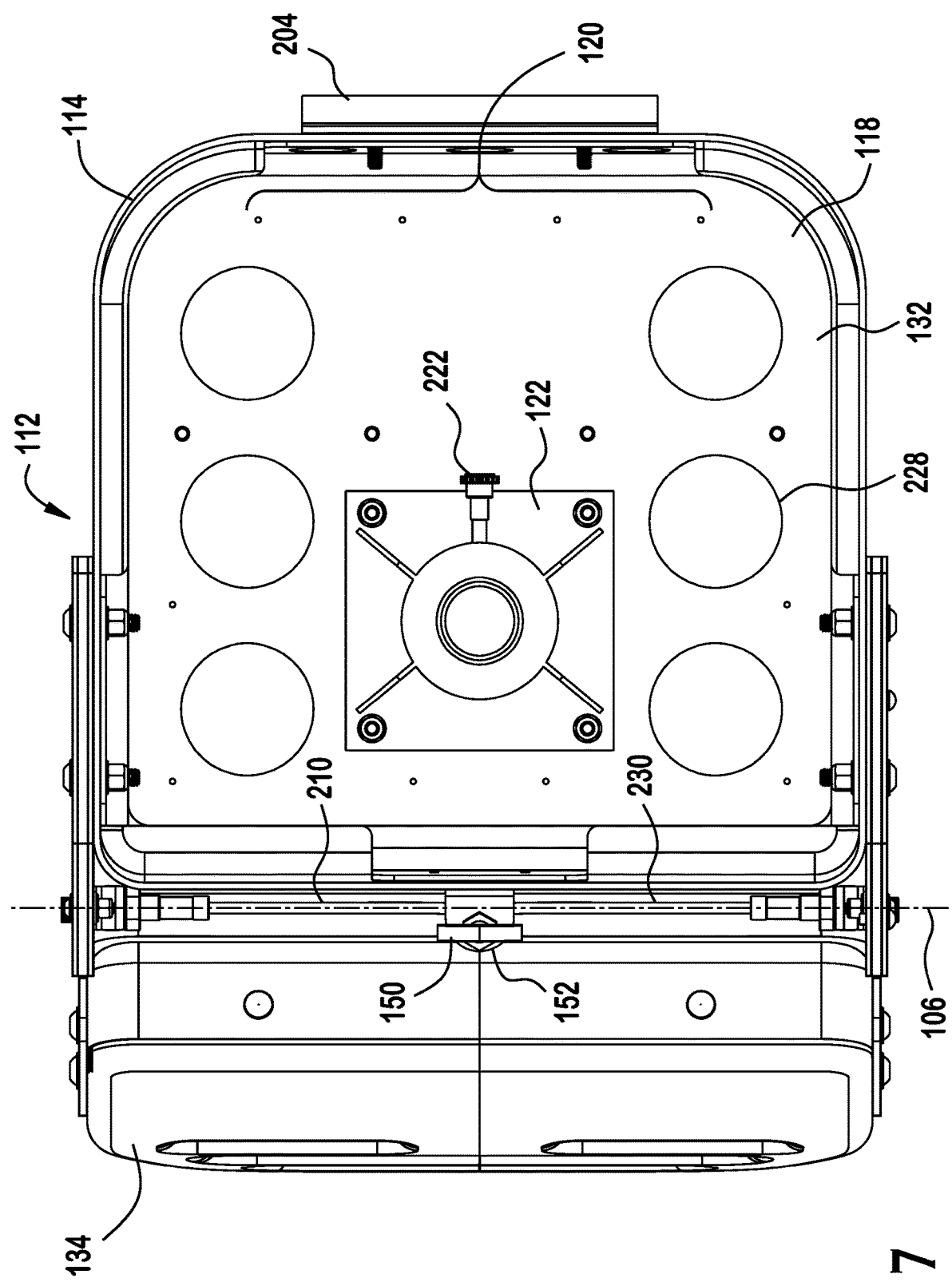
FIG. 7 is a bottom elevational view of a boat chair 110 of a preferred embodiment. The figure shows that the outer seat face 118 may be formed of the pedestal spacer 132 and the pedestal 122 may be attached thereto. The pedestal 122 may also include a pedestal locking pin 222 to retain the post 124 in the pedestal 122. The pedestal spacer 132 may include weight reducing bores 228 to reduce the weight the pedestal spacer 132 might otherwise impart to the chair body 112.
Figure 8:
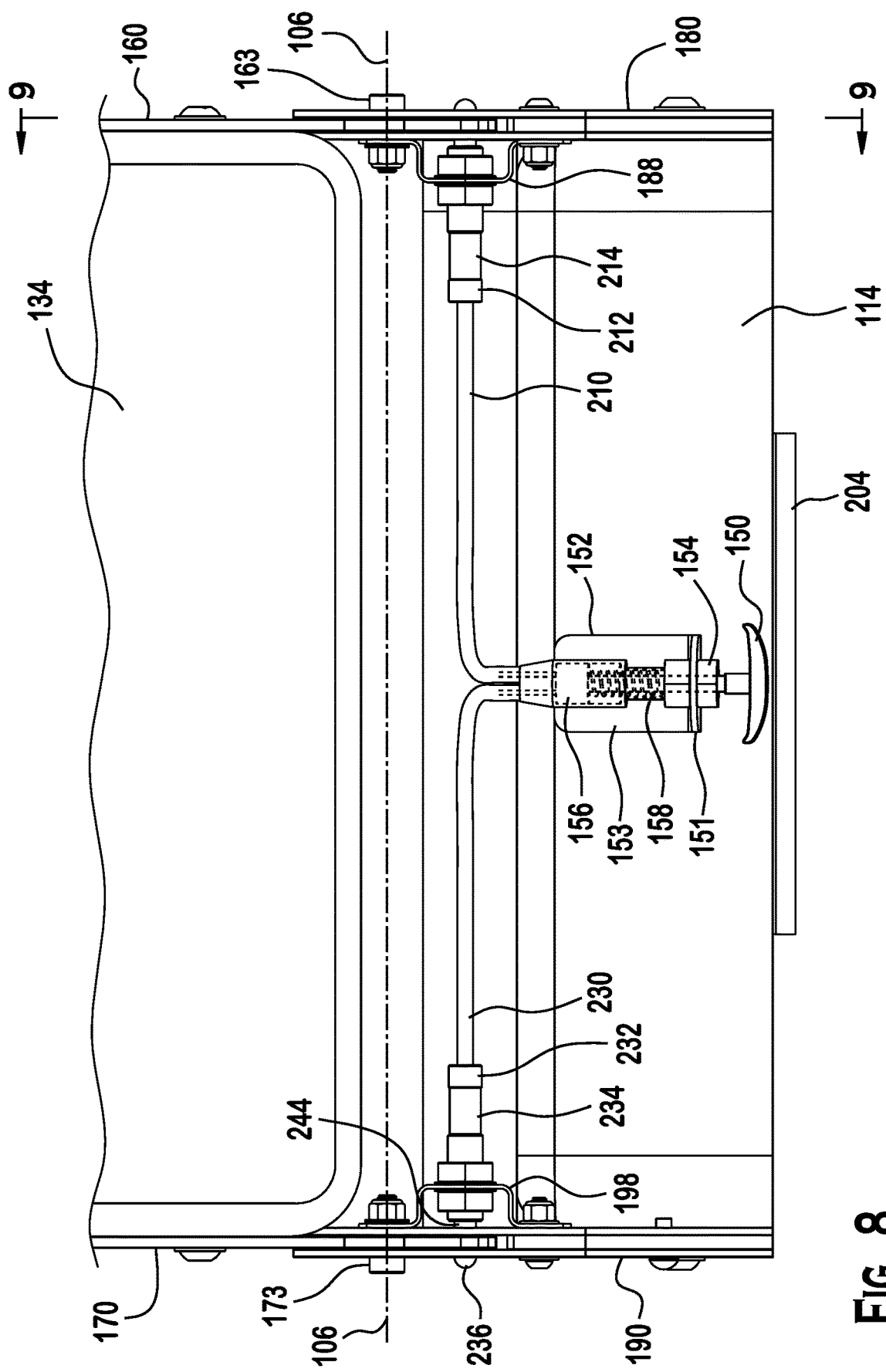
FIG. 8 is a partial enhanced view of the boat chair 110 of a preferred embodiment, providing an enhanced view of a preferred embodiment of the adjustment mechanism. Specifically, the figure shows that the handle 150 preferably engages handle bracket 152 via a fastener 154. The handle 150 may be attached to the yoke 156 (also referred to as the "yoke mechanism") and a handle biasing spring 158 may be positioned between the yoke 156 and the fastener 154 to bias the handle 150 downward to keep the connector 210 and/or second connector 230 taut. The connector 210 and second connector 230 preferably meet at the yoke 156. The connector 210 preferably extends to the right, being covered by the connector housing 212 and ending in the retaining pin 220 within the actuator housing 214. The actuator mounting bracket 188 preferably affixes the actuator housing 214 to the pair of sandwich plates 180. The distal end of the retaining pin 216 (also referred to in the claims as "a distal pin end") preferably extends through a plurality of bores 162 in the indexing plate 160. Similarly, the second connector 230 preferably extends to the left, being covered by the second connector housing 232 and ending in the second retaining pin 240 within the second actuator housing 234. The second actuator mounting bracket 198 preferably affixes the second actuator housing 234 to the second pair of sandwich plates 190. The distal end of the second retaining pin 236 (also referred to in the claims as "a distal second pin end") preferably extends through a second plurality of bores 172 in the second indexing plate 170.
Figure 9:
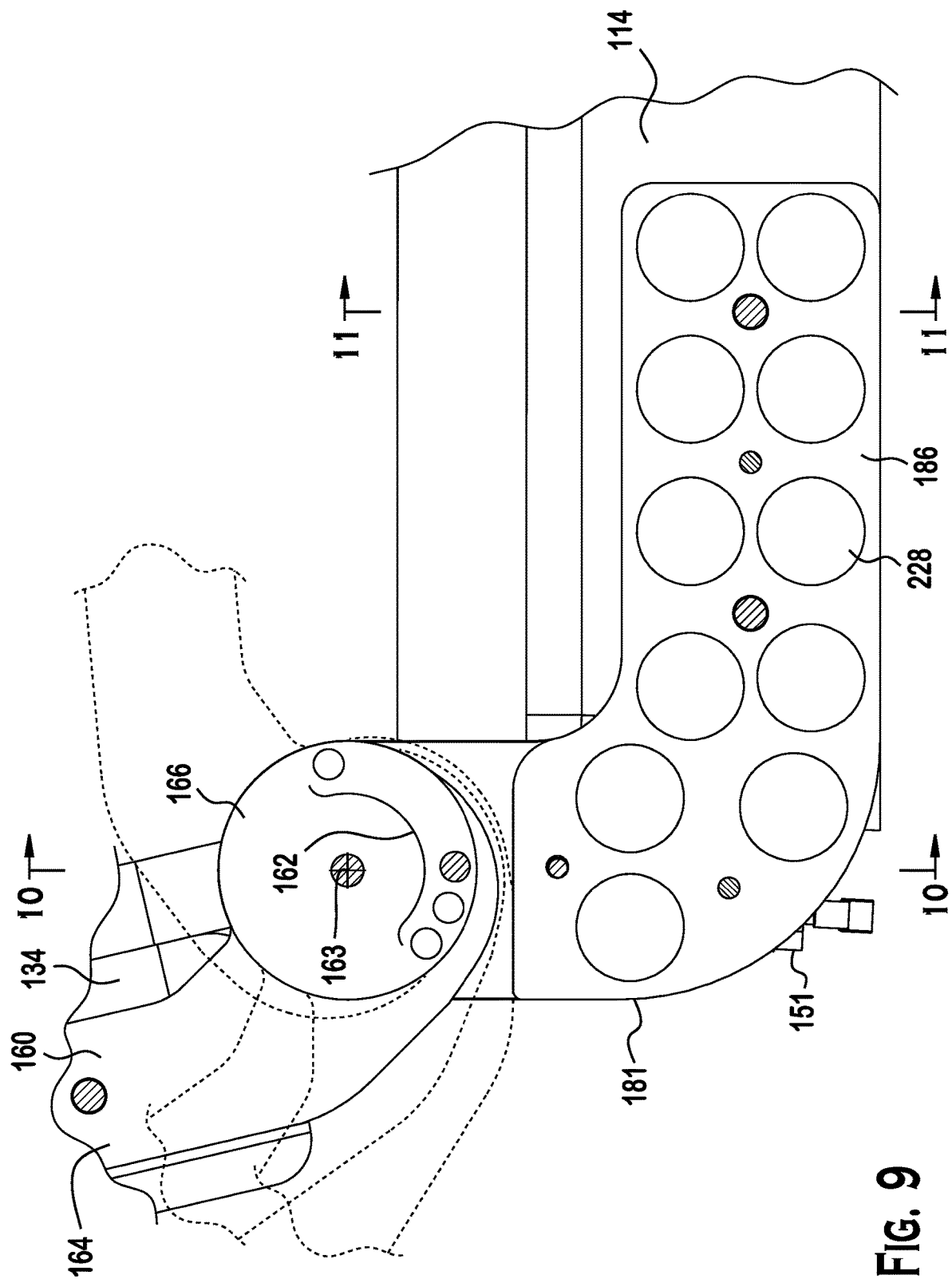
FIG. 9 is a partial cross-sectional view of the boat chair 110 of FIG. 8 as taken along lines 9-9 of FIG. 8, demonstrating the preferred positioning of the plurality of bores 162 in the indexing plate 160. The figure also provides an enhanced view of the sandwich spacer 186 and shows that the sandwich spacer 186 preferably includes weight reducing bores 228 to decrease the weight of the boat chair 110 and the amount of materials required for manufacturing.
Figure 10B:
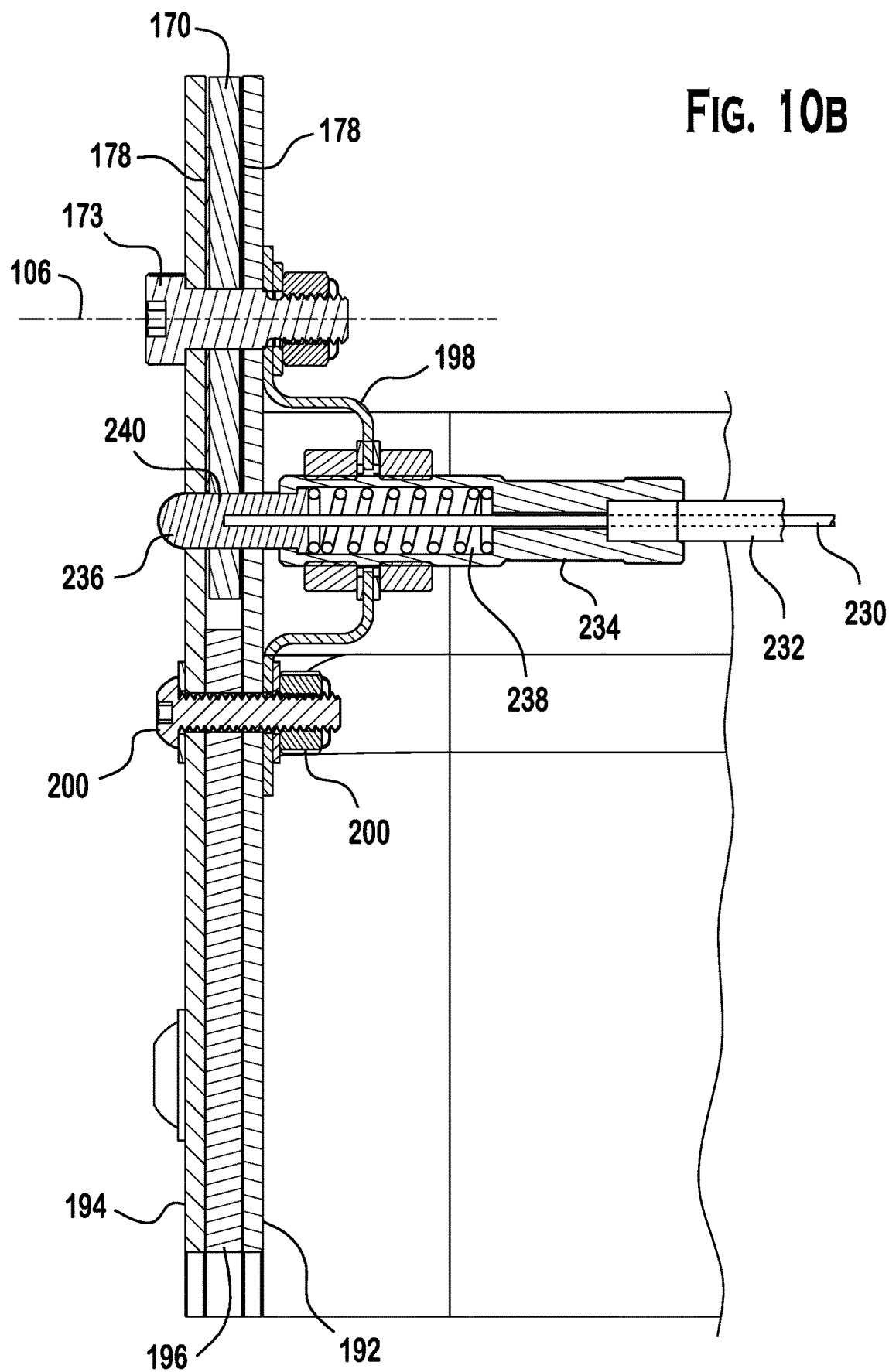
FIG. 10B is an alternate view of the partial cross-sectional view of the boat chair 110 of FIG. 10A showing the preferred left side of the adjustment mechanism, demonstrating the preferred positioning of the second connector 230 being contained within the second connector housing 232, which is itself partially contained within the second actuator housing 234, then through the second pin biasing spring 238 (also referred to in the claims as "a second biasing member"), and ending within the second retaining pin 240. The figure shows how the distal end of the second retaining pin 236 may be pulled inward so that it is fully removed from one of the second plurality of bores 172 to allow the second indexing plate 170 to turn. The figure also provides an enhanced view of the second axis screw 173 which creates the axis of rotation 106 about which the back support structure 134 might pivot relative to the seat support structure 114.

To further illustrate the various compact and open configuration, it is illustrative to consider the positioning of the general faces of the back support structure 134 and seat support structure 114 and the positional movement of these faces relative to one another. As discussed above, the chair body 112 includes the back support structure 134 and seat support structure 114 which are pivotally connected together about an axis of rotation 106 (formed, as can be seen in FIGS. 6 and 9, by an axis screw 163 and or a second axis screw 173). The back support structure 134 is preferably configured to support a user's back and torso, while the seat support structure 114 is preferably configured to support a user's hips, lower back, and upper legs. Generally speaking, the seat support structure 114 has an outer seat face 118 and an inner seat face 116, with the inner seat face 116 being positioned toward a user when seated in the chair body 112 and the outer seat face 118 being positioned away from the user when seated in the chair body 112. Similarly, the back support structure 134 has an outer back face 138 and an inner back face 136, with the inner back face 136 being positioned toward a user when seated in the chair body 112 and the outer back face 138 being positioned away from the user when seated in the chair body 112. These faces may be formed of various preferred elements without departing from the scope of this disclosure—for example, the inner back face 136 and outer back face 138 may be formed of a front support clamshell 144 and a rear support clamshell 145, respectively, or may be formed of a single piece back support structure 134. Or, alternatively, the inner back face 136 may be covered by the back rest cushion 146 and the inner seat face 116 may be covered by the seat cushion 126. These faces are general concepts useful for describing the various configurations for the chair body 112 and are not limited by the specific configurations of the back support structure 134 and seat support structure 114.

As can be seen in FIG. 6, the preferred positions of the back support structure 134 relative to the seat support structure 114 as it rotates about an axis of rotation 106 can be described, progressing counter-clockwise from the right side of the figure, as 1.) the first compact configuration; 2.) the first open configuration; 3.) the second open configuration; and 4.) the third open configuration.

When the chair body 112 is in the first compact configuration (as in FIG. 21), the inner seat face 118 and the inner back face 138 are relatively close to one another. In some preferred configurations, the inner seat face 118 and the inner back face 138 are in contact with one another, while in others they are merely close, preferably to allow the chair body 112 to move into the first compact position when the seat cushion 126 and back rest cushion 146 are attached to the inner seat face 116 and outer seat face 136, respectively.

In such a configuration, the outer seat face 118 and outer back face 138 face in roughly opposite directions.

To transition to the first open configuration (which may be referred to as the upright position), the back support structure 134 pivots away from the seat support structure 114 along the axis of rotation 106 to open the chair body 112. In this preferred, the inner back face 136 is preferably positioned at between a 75-115 degree angle from the inner seat face 116, allowing a user to be seated in the chair body 112. In the preferred embodiment, the first open configuration incudes the inner back face 136 positioned at a 105 degree angle in relation to the inner seat face 116. To transition to the second open configuration, the back support structure 134 further pivots away from the seat support structure 114 along the axis of rotation 106. Preferably, such a configuration places the inner back face 136 at between a 115-135 degree angle relative to the inner seat face 116. To transition to the third open configuration (which may be referred to as a fully reclined position), the back support structure 134 further pivots away from the seat support structure 114 along the axis of rotation 106. Preferably, such a configuration places the inner back face 136 at between a 135-175 degree angle relative to the inner seat face 116. To transition from the third open configuration to the first closed configuration, the inner back face 136 may rotate toward the inner seat face 116 until the inner back face 136 is close to the inner seat face 116.

Referring to FIGS. 3-5 and 16-20, the back support structure 134 preferably includes at least one grip 148, which may be provided in the form of holes, deformations, straps, or the like to allow the chair body 112 to be more easily lifted. In some preferred embodiments, the back support structure 134 may be formed of a single member onto which a back rest cushion 146 may be detachably affixed. In other preferred embodiments, the back support structure 134 is preferably formed of a rear support clamshell 145 (which forms the outer back face 138) and front support clamshell 144 (which forms the inner back face 136) surrounding a back support frame 140 and a back support spacer 142. The back rest cushion 146 in preferably positioned on the inner back face 136 and held thereto via snaps 224. The indexing plate 160 is preferably affixed to the rear support clamshell 145, the back support frame 140, and front support clamshell 144. A second indexing plate 170 is preferably attached to the opposing lateral side of the back support structure 134 as the indexing plate 160. All affixing is preferably provided by a plurality of fasteners 200, including screws, nuts, bolts, rivets, washers, or any combination thereof. In some preferred embodiments, such as those seen in FIGS. 17-20, the fasteners 200 which may affix the rear support clamshell 145, the back support frame 140, and front support clamshell 144 together may be position in deformations of one of these elements, to allow the contoured elements to be tightly secured via the fasteners 200. Fasteners 200 of various lengths, widths, and means (screws, rivets, etc.) may be used.

If the back support structure 134 is formed of a single member, the back support structure is preferably formed of light but durable materials, such as molded plastic or metal. Similarly, in embodiments in which a front support clamshell 144 and rear support clamshell 145 are provided, these elements are preferable formed by light and durable materials, preferably molded plastic. The back support frame 140 is preferably formed by a layer of strong metal, such as stainless steel, and the back support spacer 142 is preferably formed of bulky and lightweight material, such as a dense styrofoam or plastic foam layer, recycled plastic or paper. Those of ordinary skill in the art will appreciate from this disclosure that any suitable materials or combinations thereof may be used, such as wood, fiber glass, polymer, hard rubber, and the like, without exceeding the scope of this disclosure.

The back rest cushion 146 is preferably detachably affixed to the inner back face 136 via a plurality of snaps 224 and/or with hook-and-loop fastener 226. Those of ordinary skill in the art will appreciate from this disclosure that any suitable engagement means, such as zippers or glue may be used without exceeding the scope of this disclosure. In some preferred embodiments, the back rest cushion 146 may include a cushion skirt 127 that is connected to the back support structure 134 via snaps 224. The back rest cushion 146 may be formed of padding covered with a weather resistant material, such as vinyl, polyester, or the like. The cushion skirt 127 is preferably formed of the same material as the back rest cushion 146. Those of ordinary skill in the art will appreciate from this disclosure that any suitable material may be used without exceeding the scope of this disclosure.

Referring to FIGS. 3, 7, and 11-14, the seat support structure 114 may be formed of a single member, with an inner seat face 116 onto which a seat cushion 126 may be detachably affixed, and an outer seat face 118. The seat cushion is preferably detachably engaged to the seat support structure 114 via a plurality of snaps 224 and/or with hook-and-loop fastener. Those of ordinary skill in the art will appreciate from this disclosure that any suitable engagement means, such as zippers or glue may be used without exceeding the scope of this disclosure. In some preferred embodiments, the seat cushion 126 includes a cushion skirt 127 that is connected to the seat support structure 114 via snaps 224. The cushion skirt 127 may be short enough to only extend as far as the pair of sandwich plates 180, or the cushion skirt 127 may extend so far as to cover the entire periphery of the seat support structure 114. The seat cushion 126 may be formed of padding covered with a weather resistant material, such as vinyl, polyester, or the like. The cushion skirt 127 is preferably formed of the same material as the seat cushion 126. Those of ordinary skill in the art will appreciate from this disclosure that any suitable material may be used without exceeding the scope of this disclosure.

The seat support structure 114 preferably defines a cavity 120 in which a pedestal 122 may be positioned to receive a post 124. The seat support structure 114 is preferably formed of light but durable materials, such as molded plastic or metal. Those of ordinary skill in the art will appreciate from this disclosure that any suitable materials or combinations thereof may be used, such as wood, fiber glass, polymer, hard rubber, and the like, without exceeding the scope of this disclosure.

In some preferred embodiments, the pedestal 122 may be affixed directly to the outer seat face 118, the outer seat face 118 in such embodiments being the under side of the single piece seat support structure 114. In other preferred embodiments, a seat support spacer 128 is preferably included on top of a seat support frame 130 and a pedestal spacer 132 is preferably included below the seat support frame 130. The pedestal 122 may be attached to the underside of the pedestal spacer 132. The seat support frame 130 is preferably attached to the sides of the seat support structure 114, thus affixing the seat support spacer 128, the seat support frame 130, the pedestal spacer 132, and the pedestal 122 to the seat support structure 114. All affixing is preferably provided by a plurality of fasteners 200, including screws, nuts, bolts, rivets, washers, or any combination thereof. The seat support spacer 128 and pedestal spacer 132 are preferably formed of semi-rigid but deformable materials, such as rubber, recycled plastic, molded plastic, wood, or the like. Weight reducing bores 228 may be included in the pedestal spacer 132 and/or seat support spacer 128 to reduce weight and manufacturing costs. The seat support frame 130 is preferably formed by a layer of strong metal, such as stainless steel. Those of ordinary skill in the art will appreciate from this disclosure that any suitable materials or combinations thereof may be used, such as wood, fiber glass, polymer, hard rubber, and the like, without exceeding the scope of this disclosure.

A pedestal 122 is preferably included to better distribute the weight of the user onto the post 124. Thus it is preferred that the pedestal be formed of a hard metal, such a stainless steel. However, the pedestal may be formed of other material, such as molded plastic, or may be a single piece formed with the seat support structure 114. Those of ordinary skill in the art will appreciate from this disclosure that any suitable materials or combinations thereof may be used without exceeding the scope of this disclosure. A pedestal locking pin 222 may also be provided, to lock the post 124 in place within the pedestal 122. The pedestal locking pin 222 may also serve to adjust the height of the boat chair 110 relative to a surface, and such height adjustment may also be achieved by mechanisms for adjusting the length of the post 124, such as pneumatics.

Figure 11:
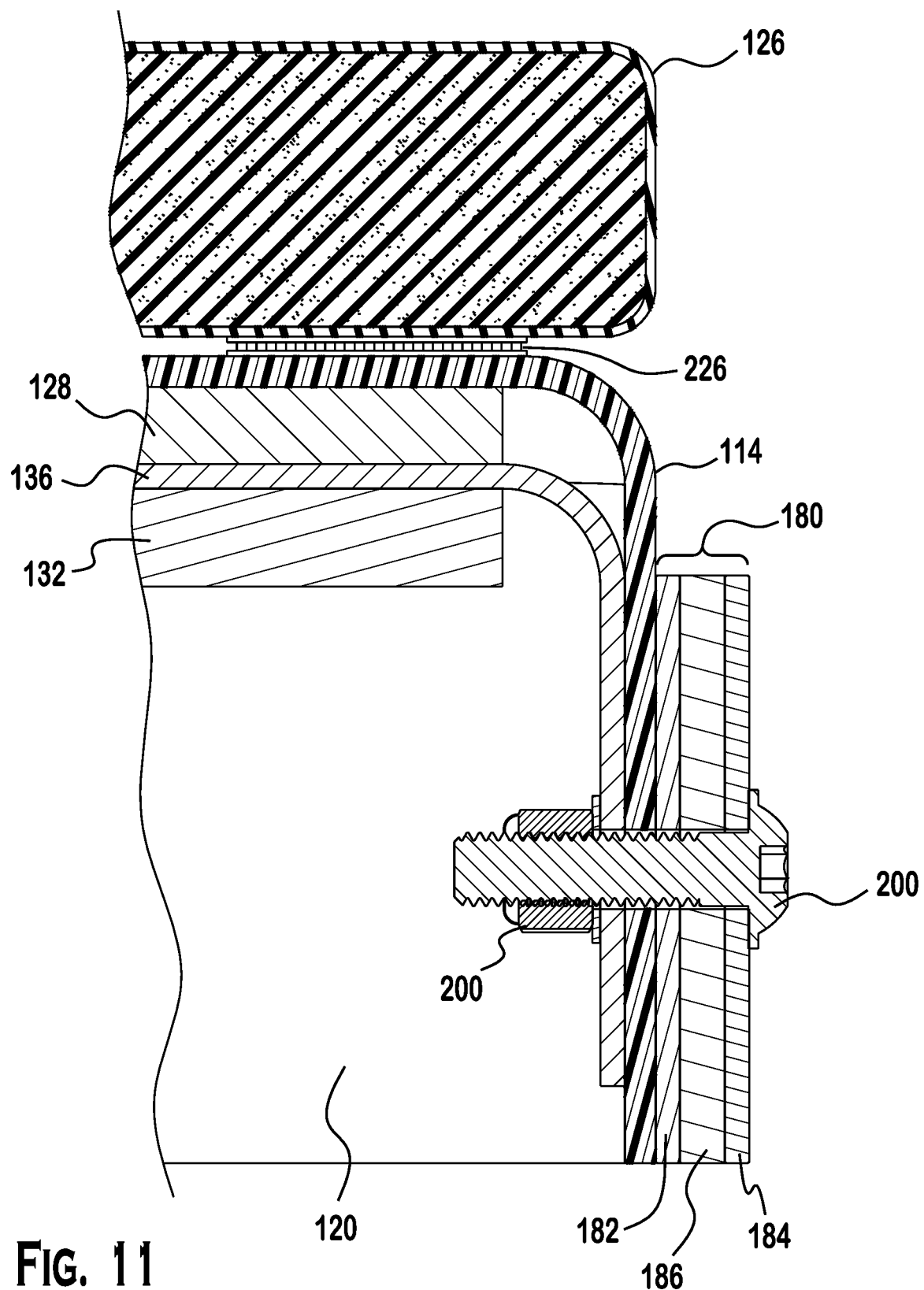
FIG. 11 is a partial cross-sectional view of the boat chair 110 of FIG. 9 as taken along lines 11-11 of FIG. 9, demonstrating how a plurality of fasteners 200, such as screws or rivets, may affix the pair of sandwich plates 180 to the seat support surface 114, and may also serve to secure the seat support frame 130 to the seat support structure 114. The figure also shows that, in some preferred embodiments, the seat cushion 126 may be detachably affixed to the seat support structure 114 with hook-and-loop fastener 226.
Figure 14:
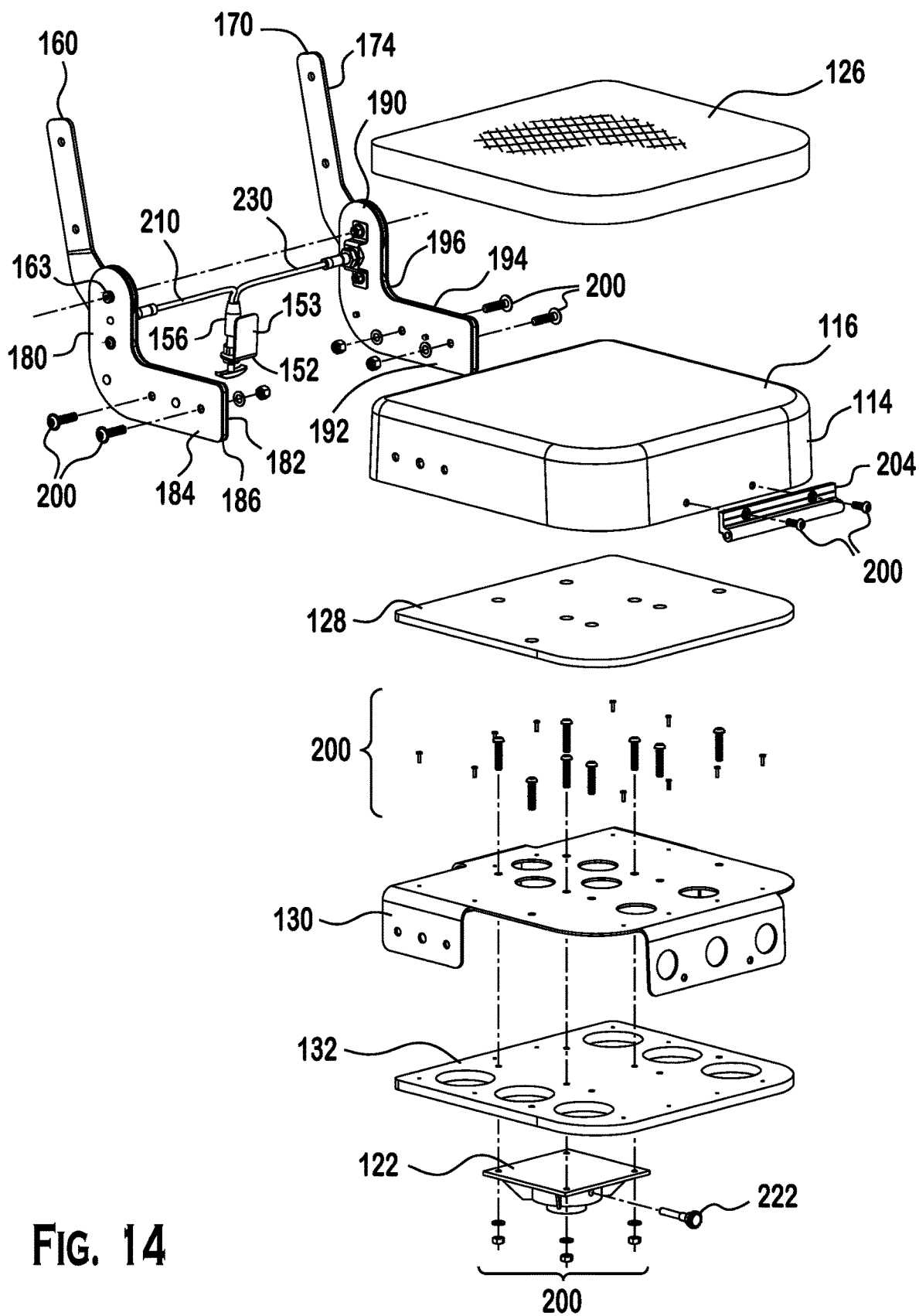
FIG. 14 is an exploded view of a portion of the boat chair 110 of a preferred embodiment, demonstrating how the seat cushion 126 is preferably affixed to the inner seat face 116 of the seat support structure 114. A seat support spacer 128 is preferably included on top of a seat support frame 130 and a pedestal spacer 132 is preferably included below the seat support frame 130. The pedestal 122 may be attached to the underside of the pedestal spacer 132. The seat support frame 130 is preferably attached to the sides of the seat support structure 114, thus affixing the seat support spacer 128, the seat support frame 130, the pedestal spacer 132, and the pedestal 122 to the seat support structure 114. All affixing is preferably provided by a plurality of fasteners 200, including screws, nuts, bolts, rivets, washers, or any combination thereof.
Figure 15A:
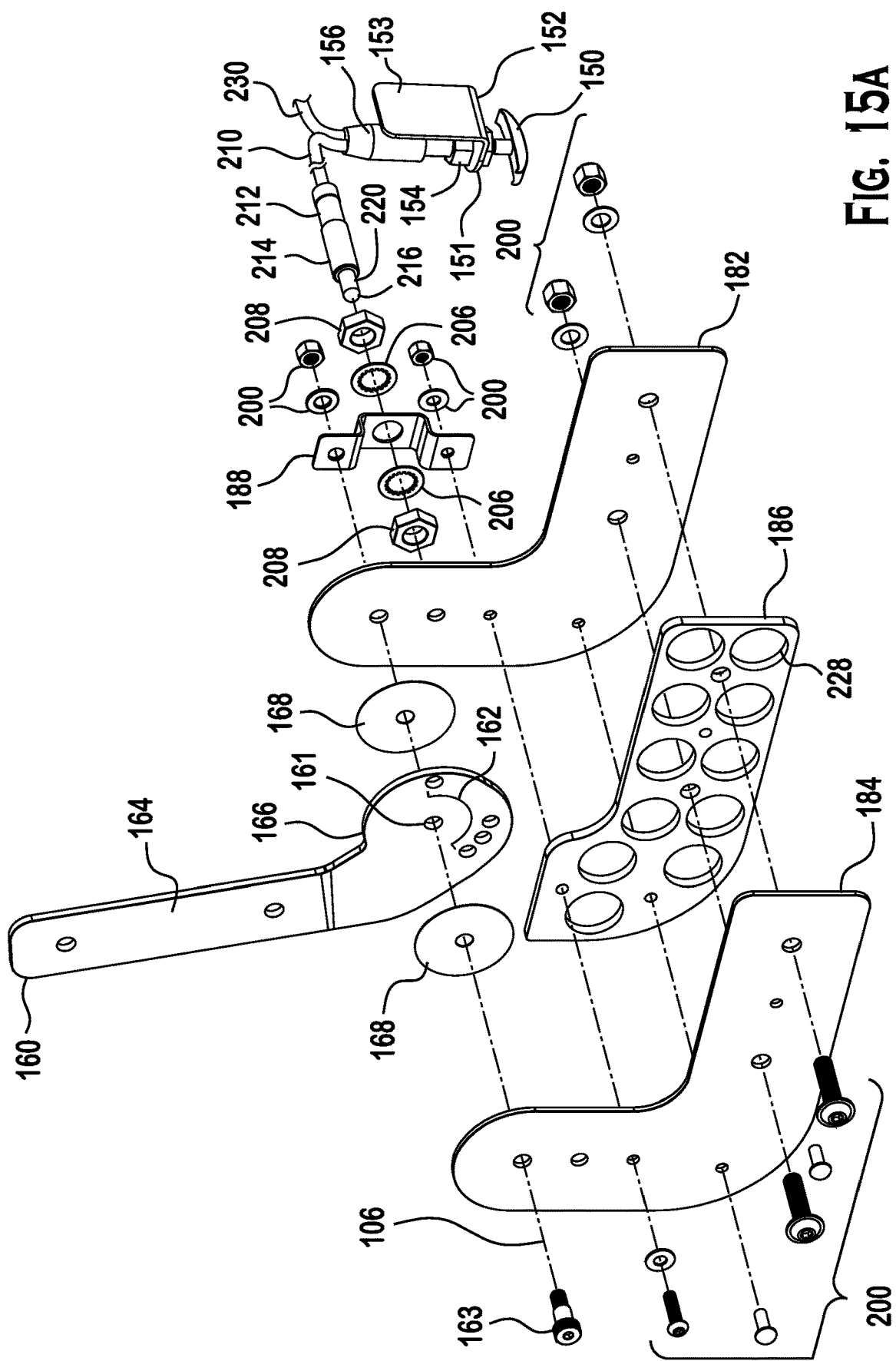
FIG. 15A is an exploded view of a portion of the boat chair 110 of a preferred embodiment, demonstrating how the pair of sandwich plates 180 comprises an outer L-shaped plate 184 and an inner L-shaped plate 182 with a sandwich spacer 186 therebetween. The indexing plate 160 preferably includes an arm portion 164 and a disc portion 166, with the plurality of bores 162 being present on the disc portion 166. The disc portion 166 is preferably positioned between a pair of plate bushings 168, with all of the pair of plate bushings 168 being positioned above the sandwich spacer 196 between the pair of sandwich plates 180. The figure also shows that a plurality lock rings 206 and tightening nuts 208 may be provided about the actuator housing 214 on either side of the actuator mounting bracket 188 to better secure the actuator housing 214 to the pair of sandwich plates 180. All affixing is preferably provided by a plurality of fasteners 200, including screws, nuts, bolts, rivets, washers, or any combination thereof.
Figure 15B:
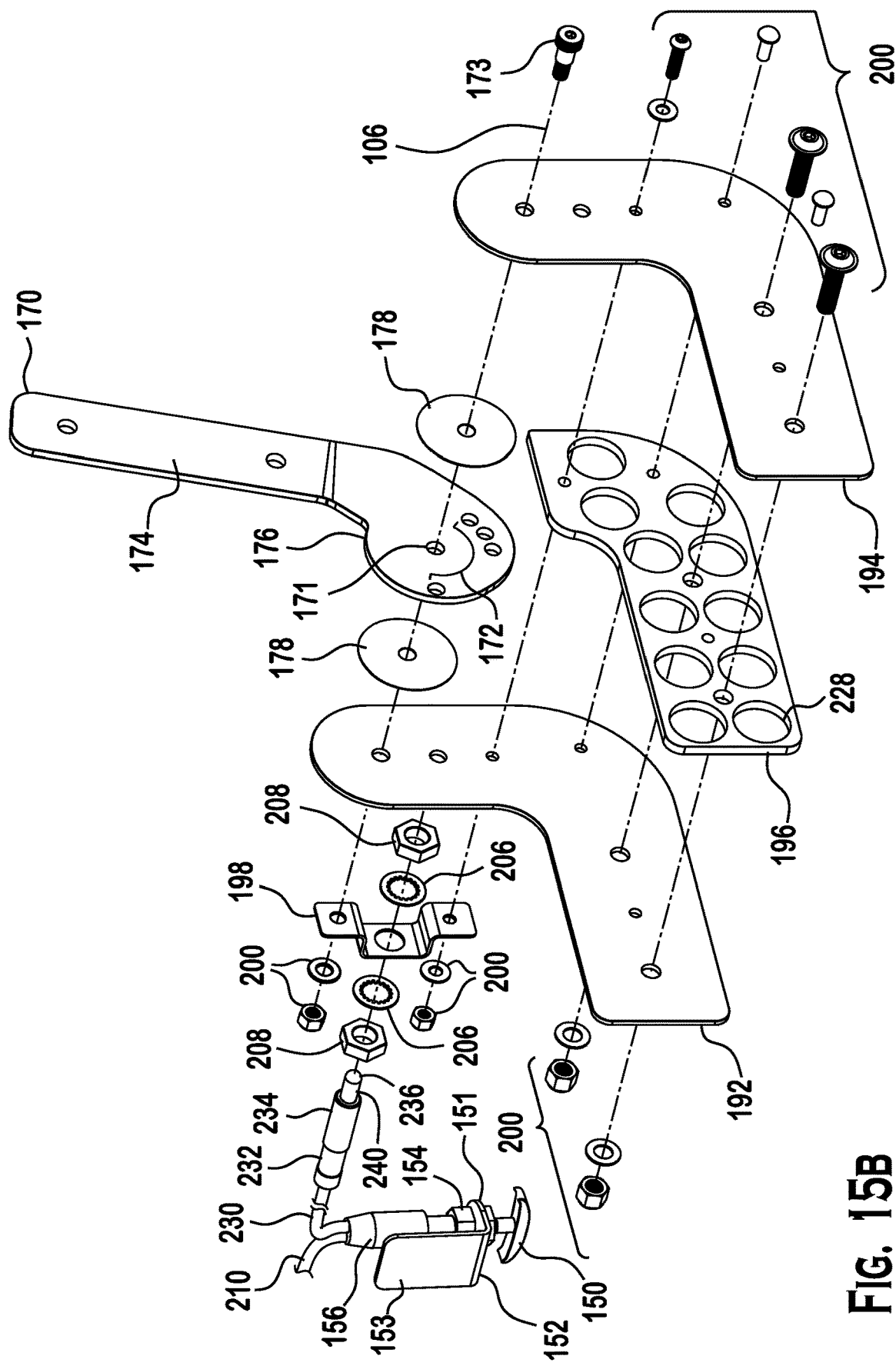
FIG. 15B is an exploded view of a portion of the boat chair 110 of a preferred embodiment, demonstrating how the second pair of sandwich plates 190 comprises a second outer L-shaped plate 194 and a second inner L-shaped plate 192 with a second sandwich spacer 196 therebetween. The second indexing plate 170 preferably includes a second arm portion 174 and a second disc portion 176, with a second plurality of bores 172 being present on the second disc portion 176. The second disc portion 176 is preferably positioned between a second pair of plate bushings 178, with all of the second pair of plate bushings 178 being positioned above the second sandwich spacer 196 between the second pair of sandwich plates 190. The figure also shows that a plurality lock rings 206 and tightening nuts 208 may be provided about the second actuator housing 234 on either side of the second actuator mounting bracket 198 to better secure the second actuator housing 234 to the second pair of sandwich plates 190. All affixing is preferably provided by a plurality of fasteners 200, including screws, nuts, bolts, rivets, washers, or any combination thereof.
Figure 16:
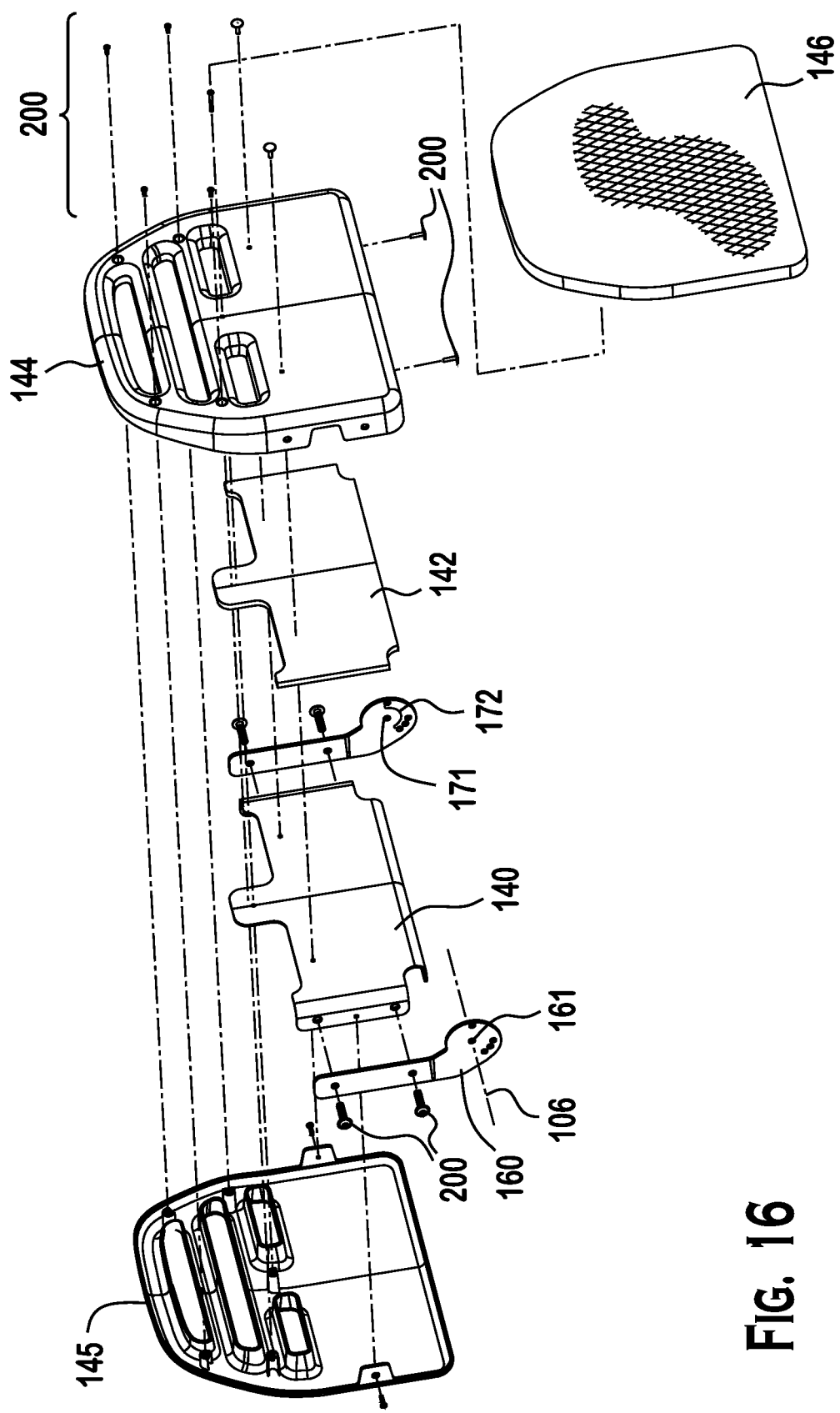
FIG. 16 is an exploded view of a portion of the boat chair 110 of a preferred embodiment, demonstrating how the back support structure 134 is preferably formed of a rear support clamshell 145 (which forms the outer back face 138) and front support clamshell 144 (which forms the inner back face 136) surrounding a back support frame 140 and a back support spacer 142. The back rest cushion 146 in preferably positioned on the inner back face 136 and held thereto via snaps 224. The indexing plate 160 is preferably affixed to the rear support clamshell 145, the back support frame 140, and front support clamshell 144. All affixing is preferably provided by a plurality of fasteners 200, including screws, nuts, bolts, rivets, washers, or any combination thereof.
Figure 17:
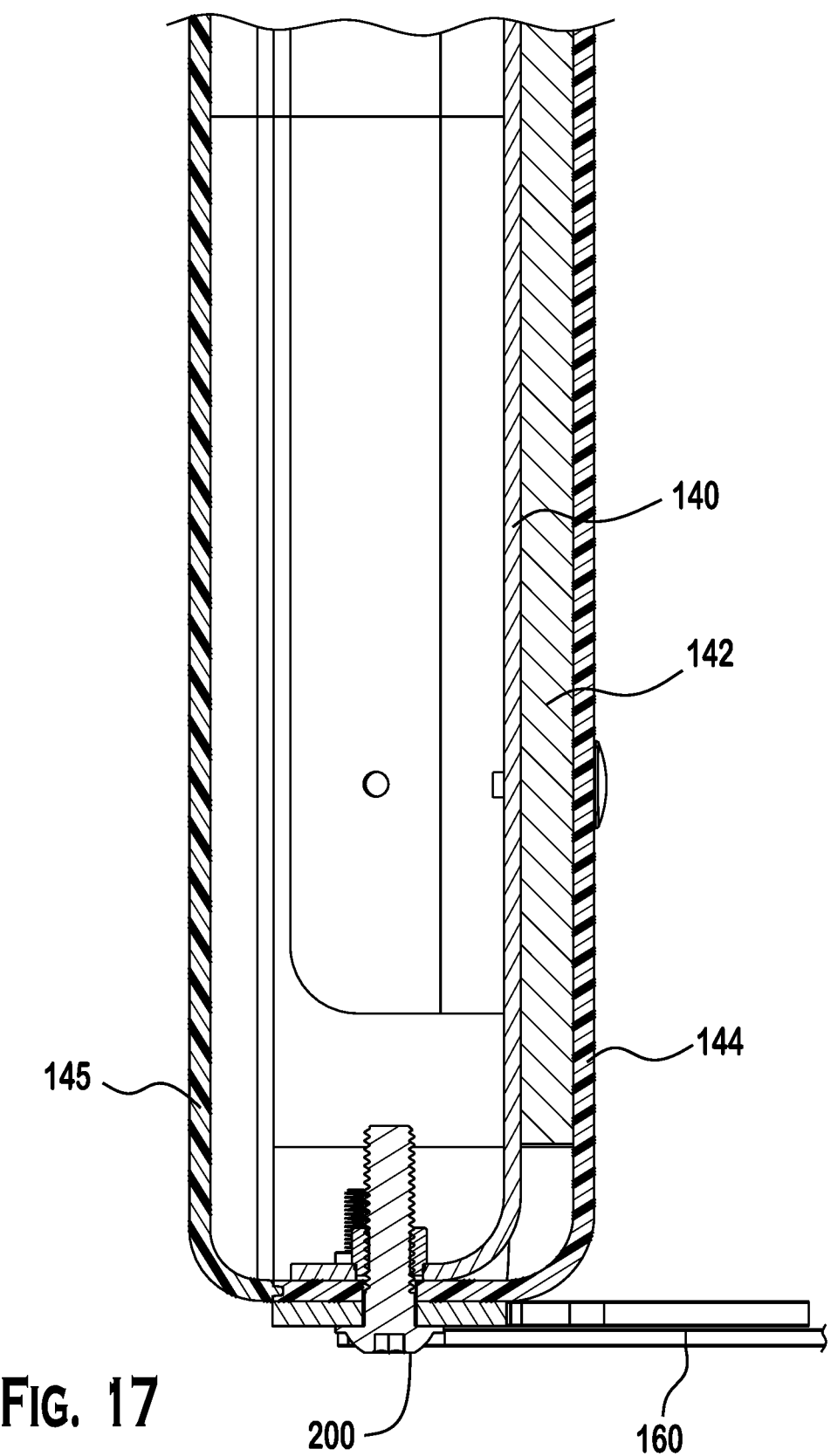
FIG. 17 is a partial cross-sectional view of the boat chair 110 of FIG. 9 as taken along lines 17-17 of FIG. 6, showing a preferred configuration of the back support structure 134 comprising a rear support clamshell 145, back support frame 140, and front support clamshell 144 fastened together via a plurality of fasteners 200. A back support spacer 142 is preferably contained between the back support frame 140 and the front support clamshell 144.
Figure 18:
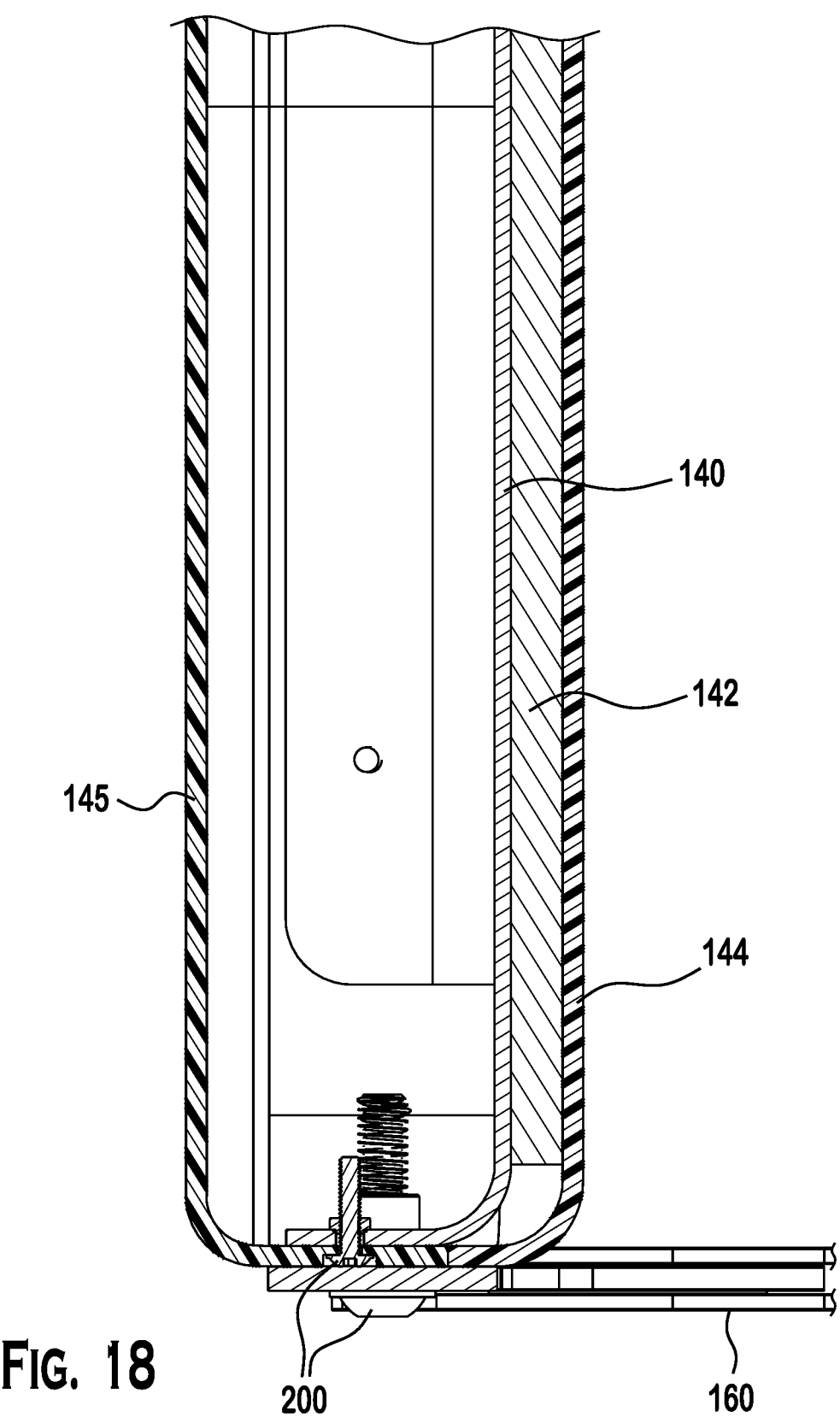
FIG. 18 is a partial cross-sectional view of the boat chair 110 of FIG. 9 as taken along lines 18-18 of FIG. 6, again showing a preferred configuration of the back support structure 134 comprising a rear support clamshell 145, back support frame 140, and front support clamshell 144 fastened together via a plurality of fasteners 200. The figure demonstrates that the plurality of fasteners 200 may be provided in various combinations of shapes and sizes.
Figure 19:
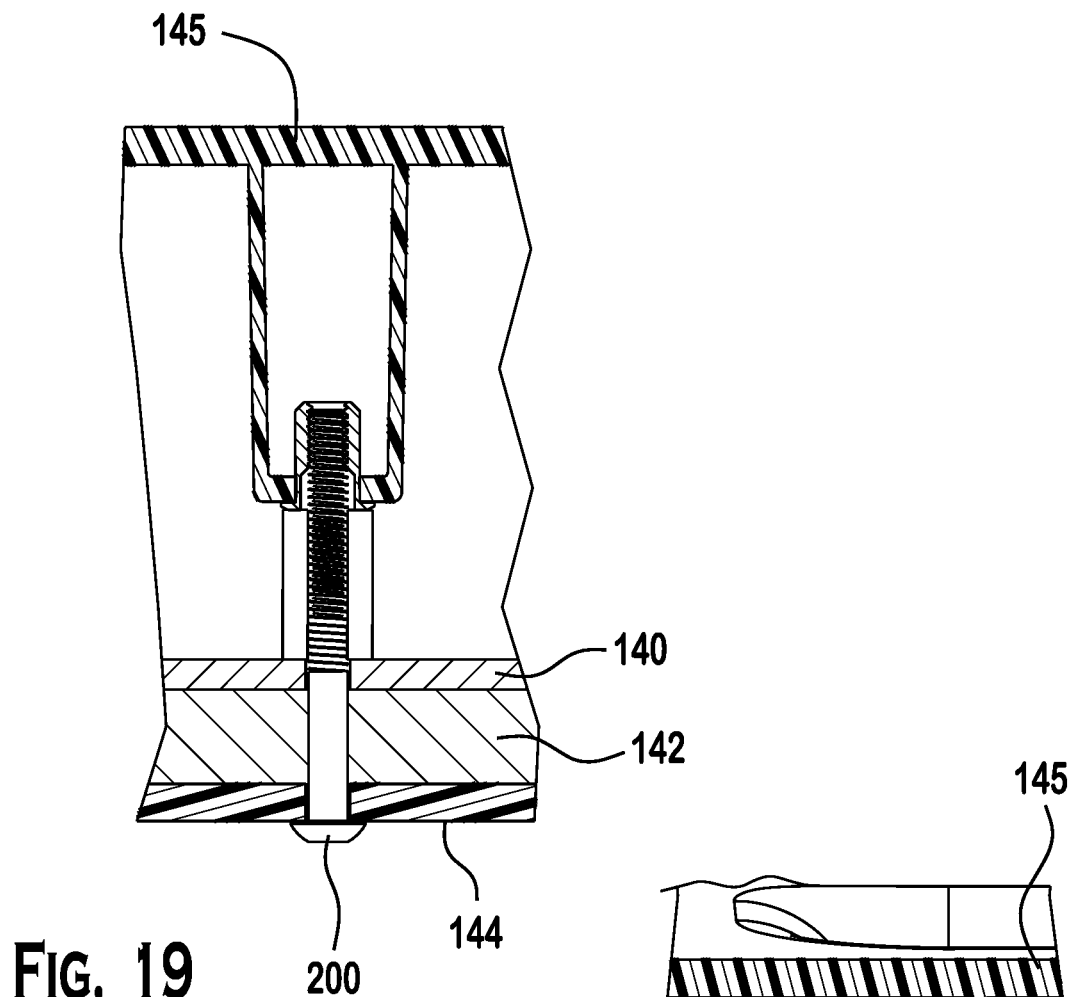
FIG. 19 is a partial cross-sectional view of the boat chair 110 of FIG. 4 as taken along lines 19-19 of FIG. 4, showing a preferred configuration of the back support structure 134 comprising a rear support clamshell 145, back support frame 140, and front support clamshell 144 fastened together via a plurality of fasteners 200. A back support spacer 142 is preferably contained between the back support frame 140 and the front support clamshell 144. The figure further shows that some fasteners 200 may be positioned in deformations of one or both of the rear support clamshell 145 and/or the front support clamshell 144.
Figure 20:
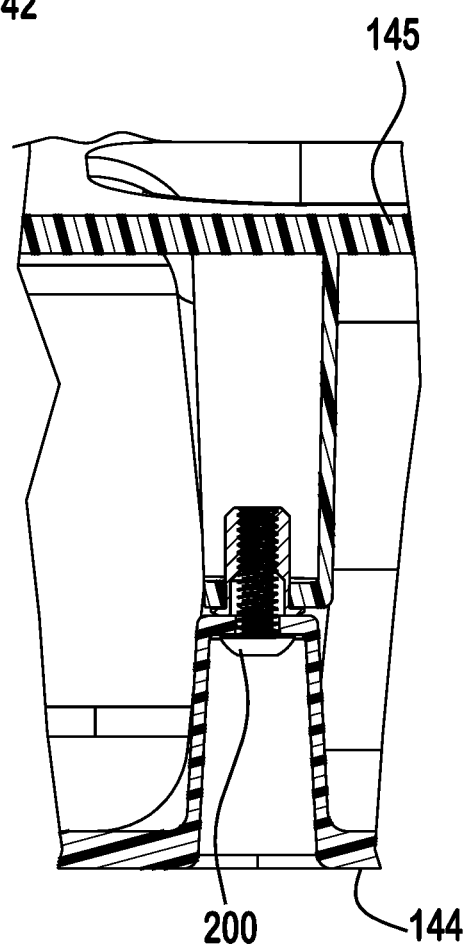
FIG. 20 is a partial cross-sectional view of the boat chair 110 of FIG. 4 as taken along lines 20-20 of FIG. 4, showing a preferred configuration of the back support structure 134 comprising a rear support clamshell 145, back support frame 140, and front support clamshell 144 fastened together via a plurality of fasteners 200. A back support spacer 142 is preferably contained between the back support frame 140 and the front support clamshell 144. The figure further shows that some fasteners 200 may be positioned in deformations of one or both of the rear support clamshell 145 and/or the front support clamshell 144.
Figure 21:
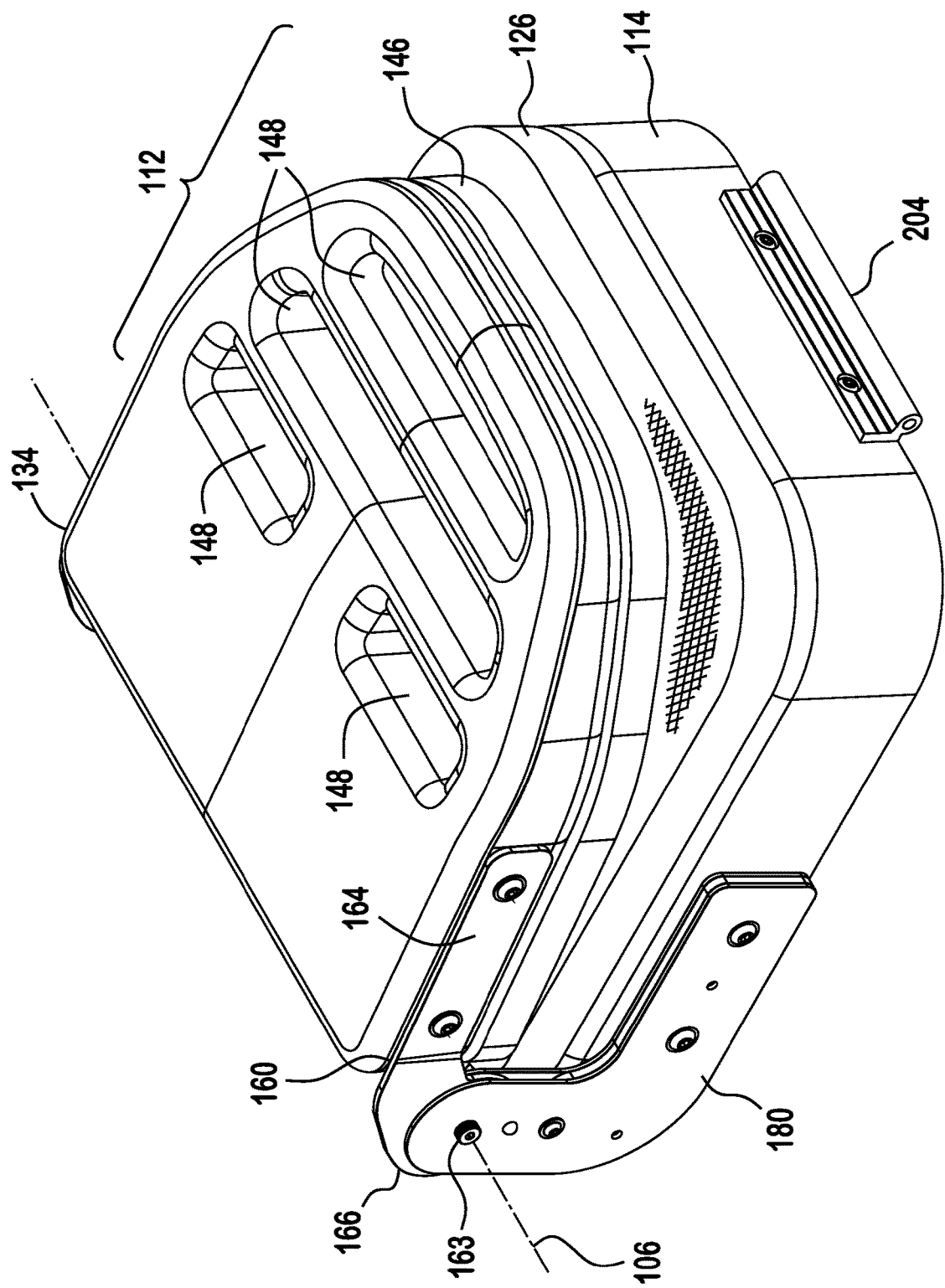
FIG. 21 is a top right perspective view of the boat chair 110 of a preferred embodiment with the chair body 112 in the first closed position, demonstrating how the first closed position may facilitate transportation or storage, include the easily accessible position of the at least one grip 148 on the seat support structure 114.
Figure 22:
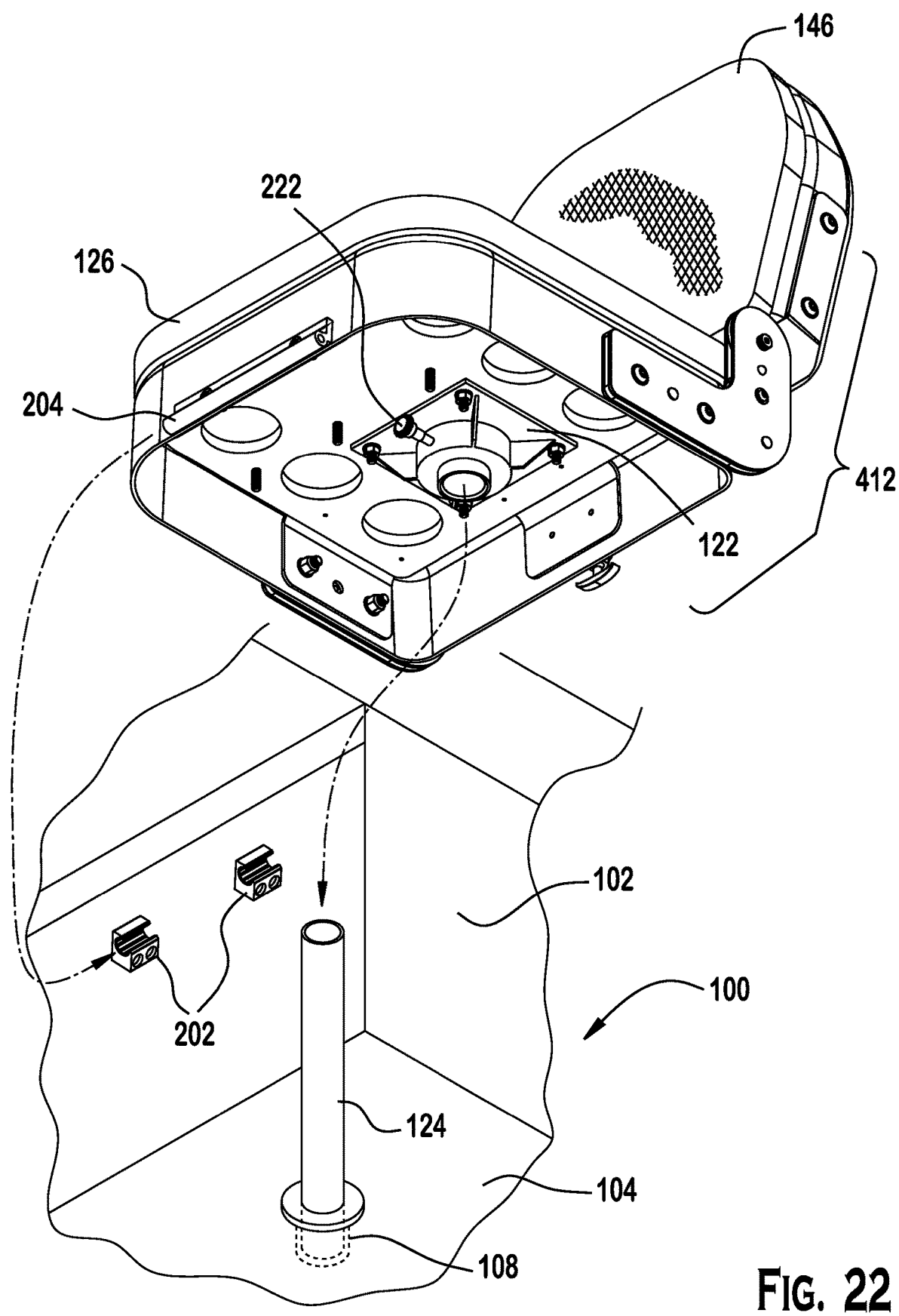
FIG. 22 is a partial perspective view of a boat 100 and the boat chair 110 of a preferred embodiment, demonstrating a preferred method of, and configuration for, mounting of the boat chair 110 on a boat 100. Specifically, the post 124 has been placed in a mounting mechanism 108 in the boat decking 103, and one or more fixed connector 202 has been positioned on the bulkhead structure 102 of the boat 100. The chair body 112 is preferably lifted above the top end of the post 124, and then lowered such that the upper end of the post 124 is inserted into the pedestal 122. The pedestal locking pin 222 may then be inserted to lock the post 124 within the pedestal 122. The chair body 112 is preferably turned such that the seat connector 204 is facing the user, then the chair body 112 is turned so that the seat connector 204 may contact, and then lock into, the one or more fixed connectors 202.
Figure 23:
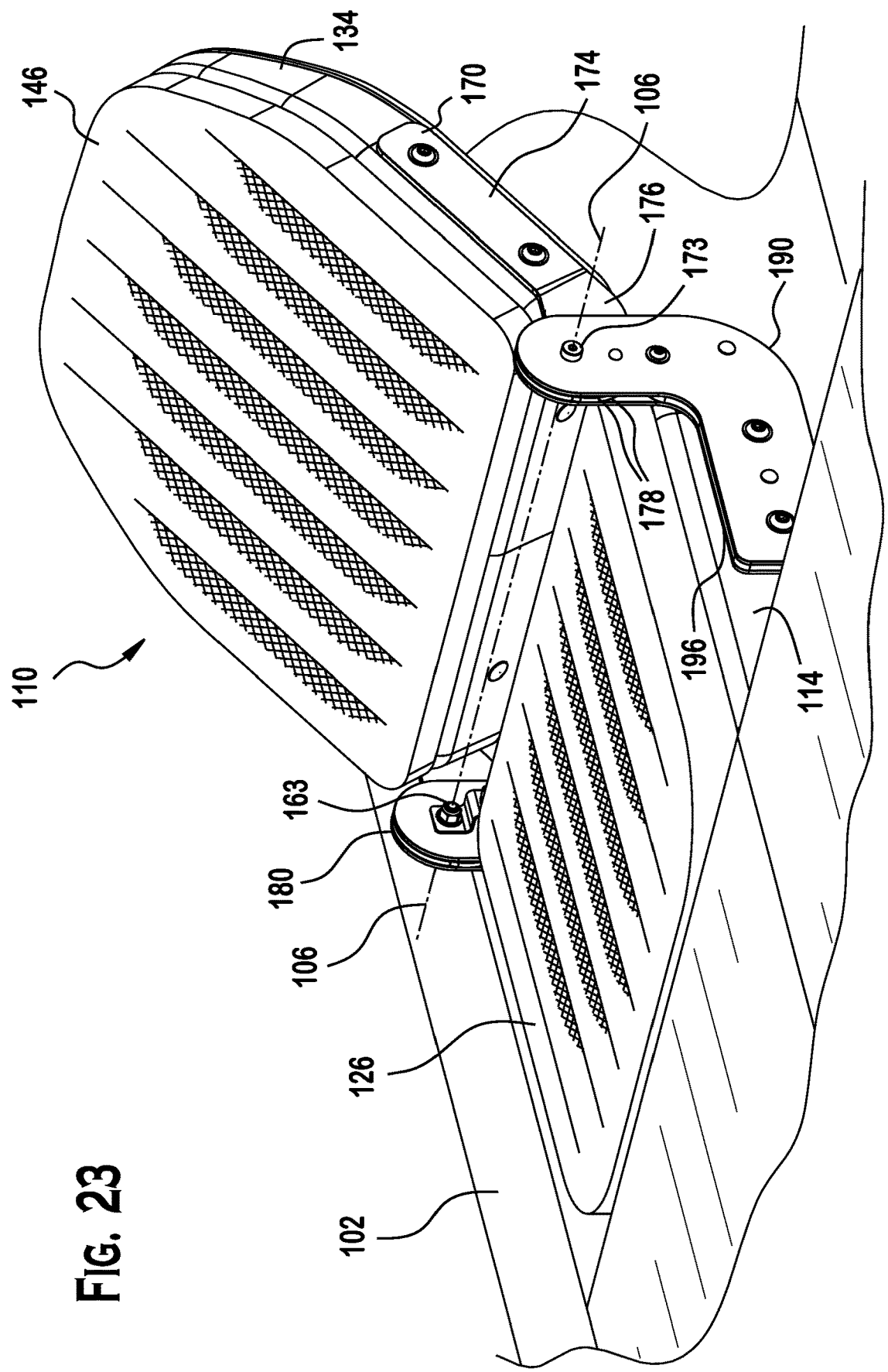
FIG. 23 is a partial front left perspective view of a boat 100 and the boat chair 110 of FIG. 22, with the chair body 112 being locked in place. The figure demonstrates a preferred configuration in which the top of the seat cushion 126 is roughly even with a portion of the bulkhead structure of the boat 102 or boat decking 104.
Figure 24:
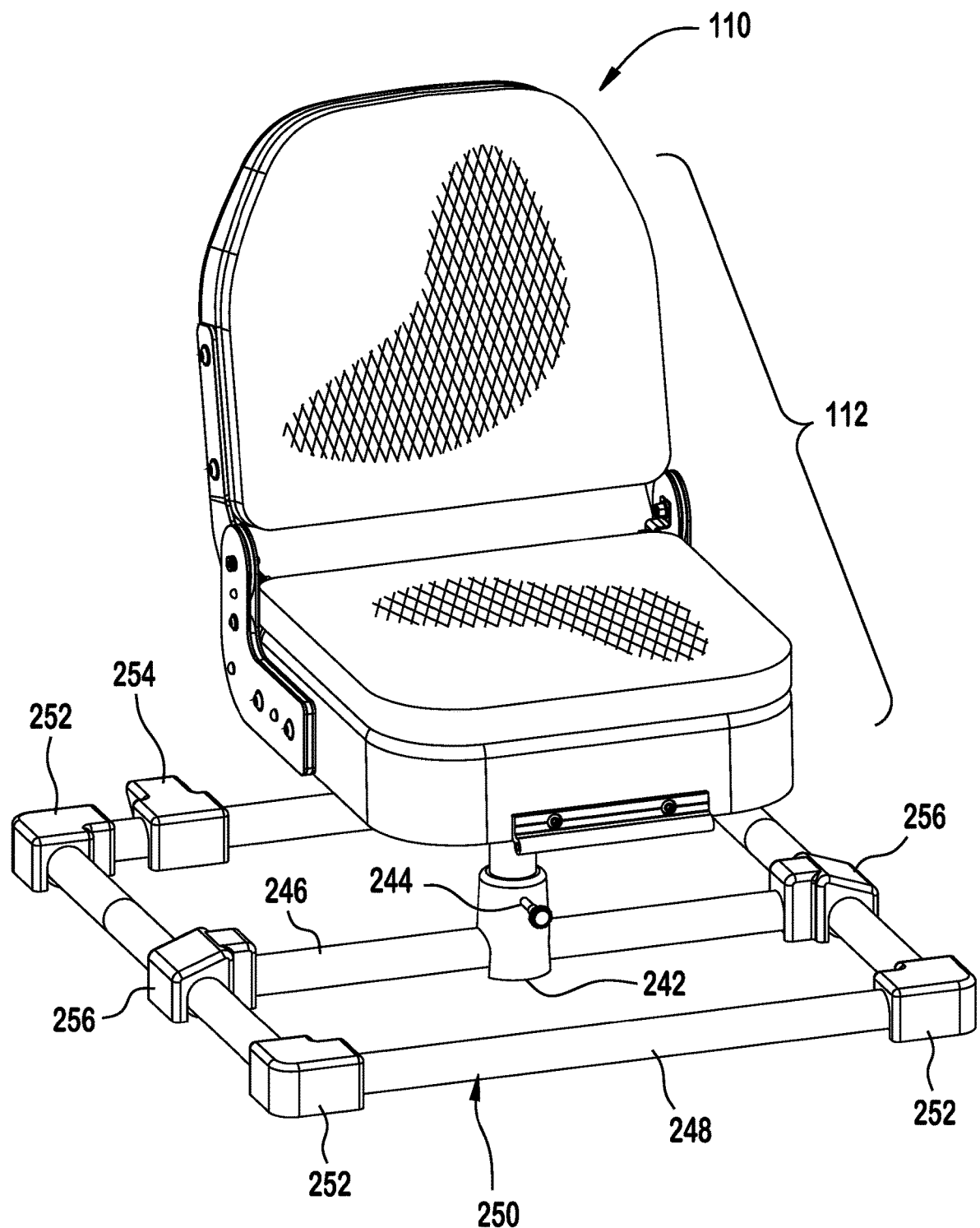
FIG. 24 is a front perspective view of the boat chair 110 of a preferred embodiment that includes a freestanding stand 250. The figure shows that the freestanding stand 250 is preferably formed of an outer frame 248, which may be formed of telescopically connected members or members connected via outer connectors 256. The freestanding stand 250 preferably also includes a stand pedestal 242 for the lower end of the post 124 to be inserted into. A stand pedestal locking pin 244 may be included to secure the post 124 in the stand pedestal 242, thus securing the chair body 112 to the freestanding stand 250. The stand pedestal 242 is preferably positioned on an inner strut 246 preferably bisecting the outer frame 240 proximate to the center of the outer frame 248.
Figure 25:
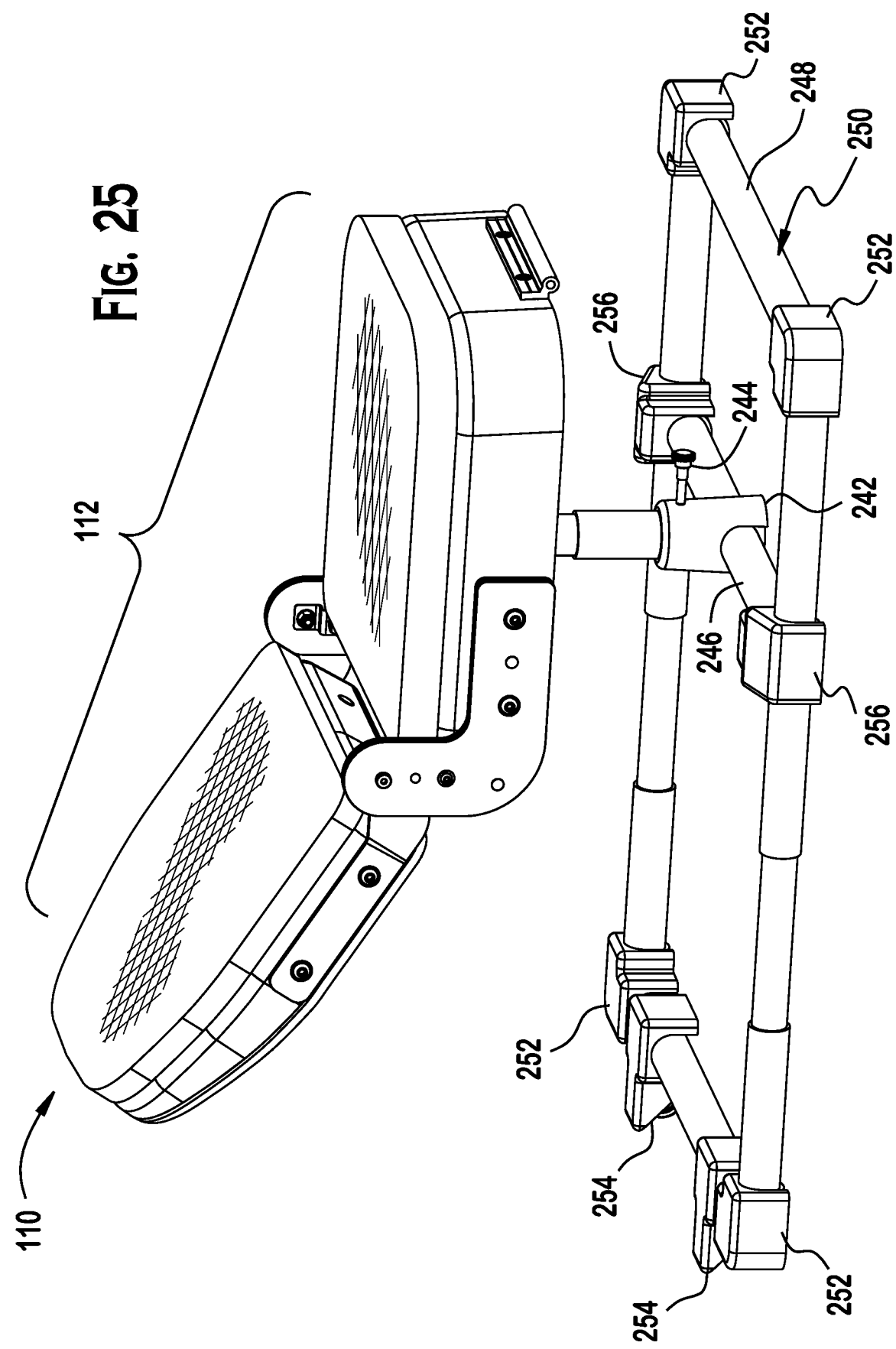
FIG. 25 is a right side perspective view of the boat chair 110 of FIG. 24 with the chair body 112 in the second use configuration, demonstrating how the adjustable outer frame 248 may be useful for counterbalancing a user's weight when the chair body 112 is reclined.
Figure 26:
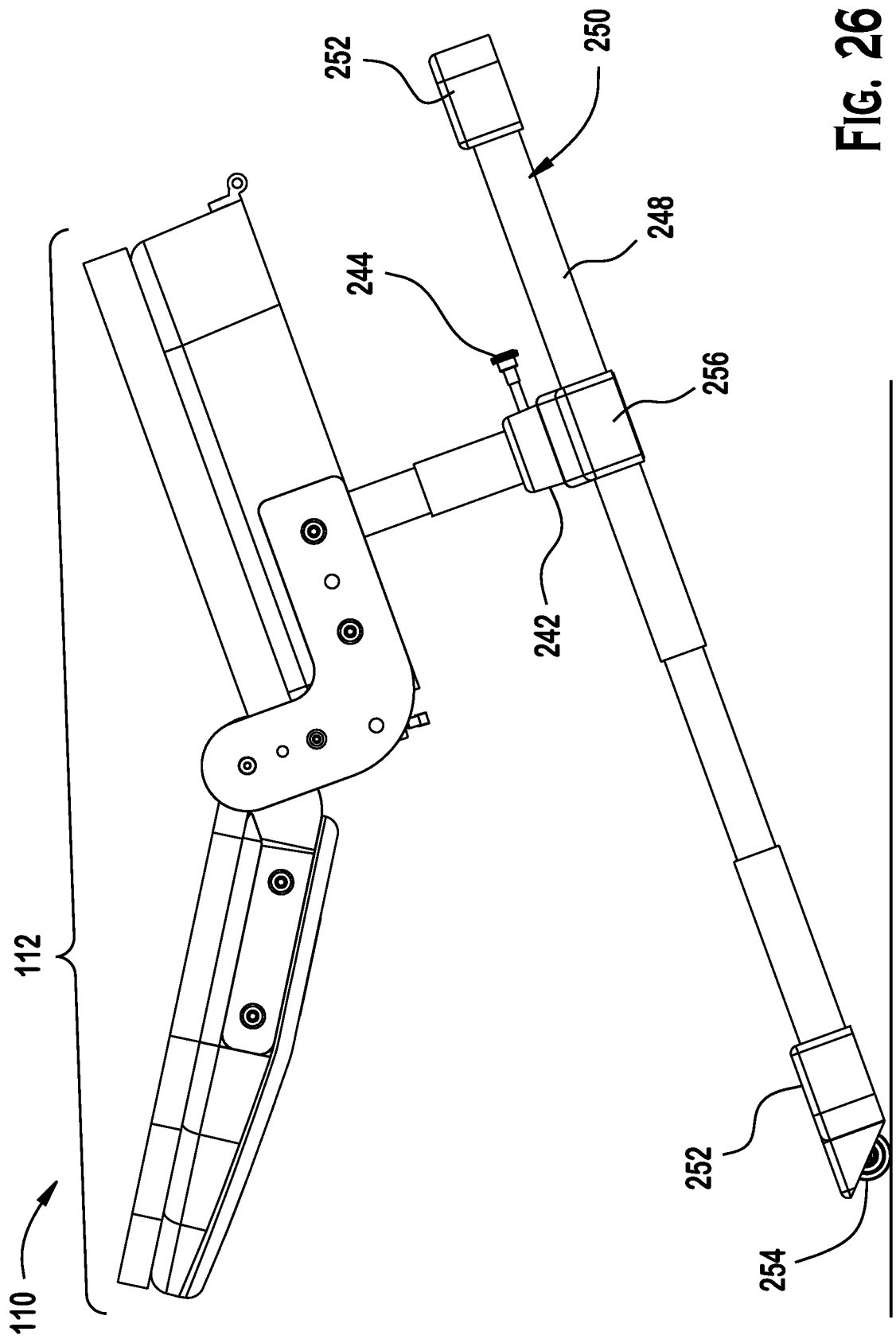
FIG. 26 is a right side perspective view of the boat chair 110 of FIG. 25 with the boat chair 110 being moved. The figure shows that wheeled feet 254 may be be provided to increase portability of the boat chair 110, preferably along the rear lateral side of the outer frame 248. The wheeled feet 254 are preferably formed of hard rubber, molded plastic, or metal.
Figure 27:
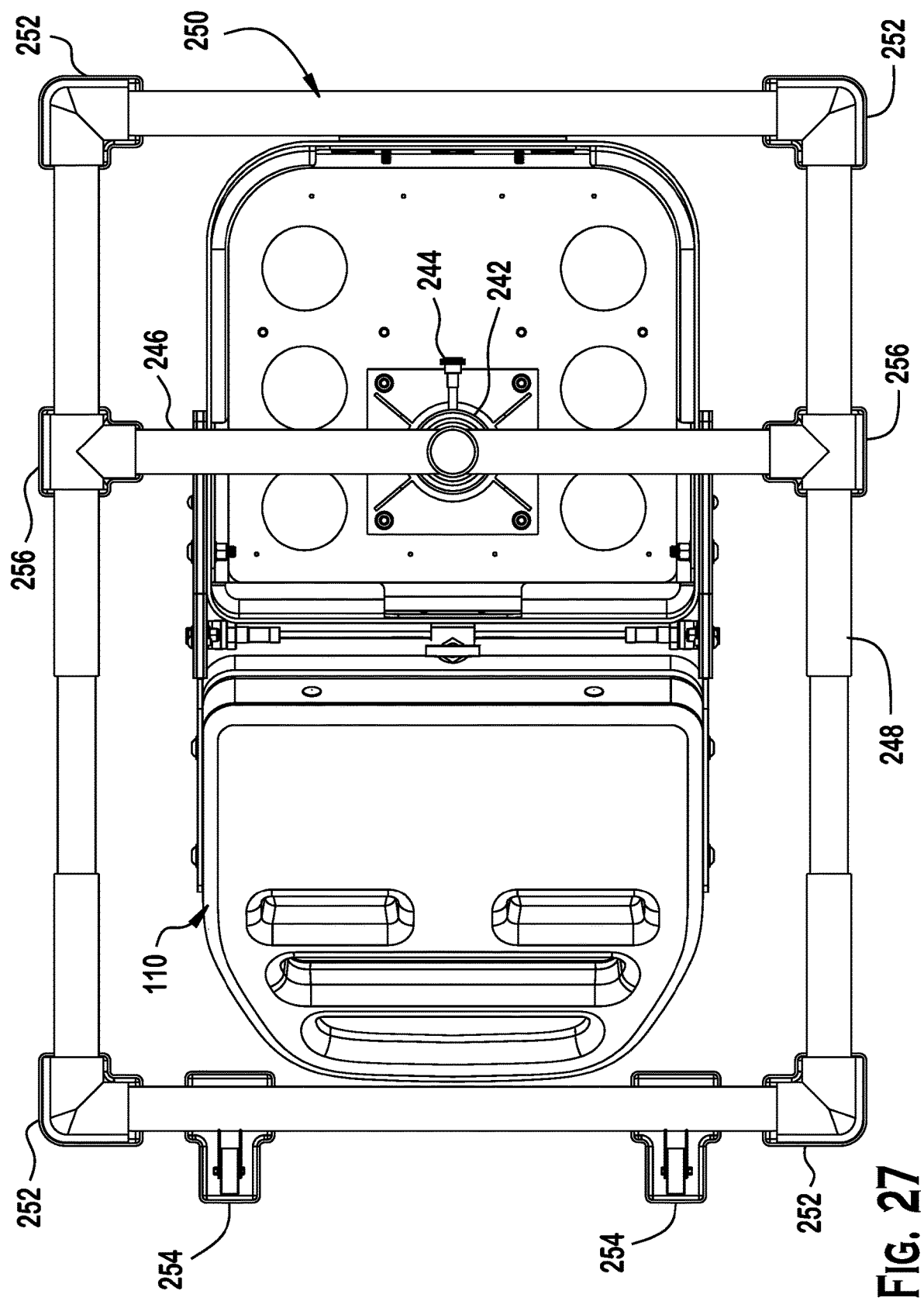
FIG. 27 is a bottom elevational view of the boat chair 110 of FIG. 24 with the chair body 112 in the second use configuration. The figure shows that the freestanding stand 250 preferably includes outer connectors 256 which may connect the members of the outer frame 248 and/or inner strut 246. As it is preferred that the boat chair 110 of this preferred embodiment is held to the boat 100 by gravity, weighted feet 252 may be included, preferably at the corners of the outer framer 248. The figure also shows that the freestanding stand 250 may also include a stand pedestal locking pin 244 in the stand pedestal 242 to lock the lower end of the post 124 within the stand pedestal 242.

The seat support structure 114 may also have additional elements affixed to its outward facing sides. Preferably, the seat connector 204 may be positioned on the front outward facing side of the seat support structure 114, and a handle bracket 152 may be affixed on the outward facing side of the seat support structure 114. The seat connector 204 and handle bracket 150 are preferably formed of a strong, durable, rust resistant material such as stainless steel. A pair of sandwich plates 180 are preferably affixed to the right outer facing side (or lateral side) of the seat support structure 114, and a second pair of sandwich plates 190 are preferably affixed to the left outer facing side (or lateral side) of the seat support structure 114. All affixing is preferably provided by a plurality of fasteners 200, including screws, nuts, bolts, rivets, washers, or any combination thereof. FIG. 11 shows an enhanced view of some of the preferred fasteners 200, with one fastener 200 (a screw) passing through the pair of sandwich plates 180, the seat support structure 114, and the seat support frame 130, and being locked therethrough by another preferred fastener 200 (a nut).

Referring to FIGS. 8-9 and 15-16, in order for the desired angle of the back support structure 134 relative to the seat support structure 114 for each open or closed configuration to be maintained, the back support structure 134 may further includes an indexing plate 160 attached thereto with a plurality of bores therein configured to receive a retaining pin 220. In some preferred embodiments, the back support structure 134 also includes a second indexing plate 170 attached thereto having a second plurality of bores 172 therein configured to receive a second retaining pin 240.

The indexing plate 160 is preferably a moderately curved piece of hardware made of metal or some suitably hard material. The indexing plate 160 preferably includes an arm portion 164 which may be connected to the back support structure 134, and a disc portion 166 with to plurality of bores 162 and the axis bore 161 cut therethrough. The disc portion 166 is preferably circular, and is meant to be positioned between the pair of sandwich plates 180, preferably with a pair of plate bushings 168 between the disc portion 166 and the pair of sandwich plates 180 to allow the disc portion 166 to rotate. The plurality of bores 162 are spaced to allow the back support structure 134 to lock into a desired position when the retaining pin 220 engages one of the plurality of bores 162. The axis bore 161 is meant to receive the axis screw 163 to create the axis of rotation 106.

The second indexing plate 170 is preferably formed of similar shape as the indexing plate 160 and formed of the same materials. The second indexing plate 170 preferably includes a second arm portion 174 which may be connected to the back support structure 134, and a second disc portion 176 with the second plurality of bores 172 and the second axis bore 171 cut therethrough. The second disc portion 176 is preferably roughly circular, and is meant to be positioned between the second pair of sandwich plates 190, preferably with a second pair of plate bushings 178 between the second disc portion 176 and the second pair of sandwich plates 190 to allow the second disc portion 176 to rotate. The second plurality of bores 172 are spaced to correspond with the first plurality of bores 162 to allow the back support structure 134 to lock into a desired position on both lateral sides when the retaining pin 220 engages one of the plurality of bores 162 and the second retaining pin 240 engages a corresponding one of the second plurality of bores 172. The second axis bore 171 is meant to receive the second axis screw 173 to create the axis of rotation 106 on both lateral sides of the chair body 112.

Referring to FIGS. 2, 7-9, 14, 15A, and 15B, the boat chair 110 of the preferred embodiment preferably further includes a pair of sandwich plates 180 configured to house the indexing plate 160, specifically the disc portion 166 of the indexing plate 160, located therebetween. The boat chair 110 of the preferred embodiment preferably also includes a second pair of sandwich plates 190 configured to house the second indexing plate 170, specifically the second disc portion 176 of the second indexing plate 170, located therebetween. The pair of sandwich plates 180 and second pair of sandwich plates 190 are preferably affixed to the outer lateral sides of the seat support surface 114 and preferably extend rearward past the outer surface of the rear side of the seat support structure 114 at least as far as the handle abutment face 151 of the handle bracket 152. The space between the pair of sandwich plates 180 on the right lateral side of the seat support structure 114 and the second pair of sandwich plates 190 on the left later sides of the seat support surface 114 may include the adjustment elements, such as the connector 210, connector housing 212, actuator housing 214, second connector 230, second connector housing 232, second actuator housing 234, yoke 156, handle 150, and handle bracket 152. The actuator housing 214 maybe affixed to the pair of sandwich plates 180 by actuator mounting bracket 188, and the second actuator housing 234 may be affixed to the second pair of sandwich plates 190 by the second actuator mounting bracket 198.

The pair of sandwich plates 180 preferably comprises both an outer L-shaped plate 184 and an inner L-shaped plate 182 which perform the sandwiching action for which the pair of sandwich plates 180 are name. The pair of sandwich plates 180 preferably further comprise a sandwich spacer 186 between the outer L-shaped plate 184 and inner L-shaped plate 182, as well as a pair of plate bushings 168 positioned on each side of the indexing plate 160 (specifically the disc portion 166 of the indexing plate 160), thus being positioned between the indexing plate 160 and both the outer L-shaped plate 184 and inner L-shaped plate 182.

A similar configuration is preferred for embodiment in which a second pair of sandwich plates 190 are provided. The second pair of sandwich plates 190 configured to house the second indexing plate 170, specifically the second disc portion 176 of the second indexing plate 170, located therebetween. The second pair of sandwich plates 190 preferably comprises both a second outer L-shaped plate 194 and a second inner L-shaped plate 192 which perform the sandwiching action for which the second pair of sandwich plates 190 are named. The second pair of sandwich plates 190 preferably further comprise a second sandwich spacer 196 between the second outer L-shaped plate 194 and second inner L-shaped plate 192, as well as a second pair of plate bushings 178 positioned on each side of the second indexing plate 170 (specifically the second disc portion 176 of the second indexing plate 170), thus being positioned between the second indexing plate 170 and both the second outer L-shaped plate 194 and second inner L-shaped plate 192.

The outer L-shaped plate 184, inner L-shaped plate 182, second outer L-shaped plate 194, and second inner L-shaped plate 192 are all roughly L-shaped and may be configured to allow the axis screw 163 and/or second axis screw 173 to pass therethrough to reengage the indexing disc 160 and/or second indexing disc 170. As can best be seen in FIGS. 7 and 9, the portion of the pair of sandwich plates 180 and second pair of sandwich plates 190 which extends farthest outward from the rear surface of the seat support structure 113 (preferably the vertical portion of the L-shape) preferably extends at least as far as the handle abutment face 151 of the handle bracket 152. The outer L-shaped plate 184, inner L-shaped plate 182, second outer L-shaped plate 194, and second inner L-shaped plate 192 are preferably formed of a suitably hard and durable materials which may still allow the indexing disc 160 and/or second indexing disc 170 to rotate, preferably molded plastic or metal, such as steel. However, those of ordinary skill in the art will appreciate from this disclosure will appreciate that any suitable material may be provided without exceeding the scope of this disclosure.

The pair of plate bushings 168 and second pair of plate bushings 178 are preferably roughly circular in shape, and preferably small enough to only cover the portion of the indexing plate 160 and/or second indexing plate 170 not configured to include the plurality of bores 162 and second plurality of bores 172, respectively. The pair of plate bushings 168 and second pair of plate bushings 178 are preferably configured to allow the axis screw 163 and/or second axis screw 173 to pass therethrough to reengage the indexing disc 160 and/or second indexing disc 170. The pair of plate bushings 168 and second pair of plate bushings 178 are preferably formed of materials which are both durable (to withstand pressure and frequent spinning) and less prone to friction. Molded plastic or metal is preferred. However, those of ordinary skill in the art will appreciate from this disclosure will appreciate that any suitable material may be provided without exceeding the scope of this disclosure.

The sandwich spacer 186 is preferably at least as wide as the combined width of the disc portion 166 of the indexing disc 160 and the pair of plate bushings 168 (and the second sandwich spacer 196 is preferably at least as wide as the combined width of the second disc portion 176 of the second indexing disc 170 and the second pair of plate bushings 178). The sandwich spacer 186 and second sandwich spacer 196 are preferably semi-rigid but deformable and are thus preferably formed of materials such as rubber, recycled plastic, molded plastic, wood, or the like. Those of ordinary skill in the art will appreciate from this disclosure that any suitable materials or combinations thereof may be used, such as wood, fiber glass, polymer, hard rubber, and the like, without exceeding the scope of this disclosure. Weight reducing bores 228, including holes, deformation, and the like, may also be included to reduce weight and manufacturing costs.

Referring to FIGS. 3, 8-9, 10A, 10B, and 15, the boat chair 110 of the preferred embodiment preferably further includes an adjustment mechanism which includes the following preferred elements. A handle 150 is preferably provided that engages the handle bracket 152 via a fastener 154. The handle 150 may be attached to the yoke mechanism 156 (also referred to as the yoke 156) and a handle biasing spring 158 may be positioned between the yoke 156 and the fastener 154 to bias the handle 150 downward to keep the connector 210 and/or second connector 230 taut and the handle in contact with the handle abutment face 151 of the handle bracket 152 when the handle 150 is not in use. The connector 210 and second connector 230 preferably meet at the yoke 156. The connector 210 preferably extends to the right, being covered by the connector housing 212 and ending in the retaining pin 220 within the actuator housing 214. The actuator mounting bracket 188 preferably affixes the actuator housing 214 to the pair of sandwich plates 180. The distal end of the retaining pin 216 preferably extends through a plurality of bores 162 in the indexing plate 160. Similarly, the second connector 230 preferably extends to the left, being covered by the second connector housing 232 and ending in the second retaining pin 240 within the second actuator housing 234. The second actuator mounting bracket 198 preferably affixes the second actuator housing 234 to the second pair of sandwich plates 190. The distal end of the second retaining pin 236 preferably extends through a second plurality of bores 172 in the second indexing plate 170.

To describe these elements another way, boat chair 110 of the present invention preferably includes yoke mechanism 156 disposed along the seat support structure 114 and axially displaced along the axis of rotation 106 from the actuator housing 214. The yoke 156 is preferably oriented perpendicularly relative to the axis of rotation 106. A connector 210 preferably extends from the retaining pin 220 to the yoke mechanism 156 such that the retaining pin 220 can be disengaged from the indexing plate 160 so that the back support structure 134 can be pivotally moved relative to the seat support structure 114 by operation of the yoke mechanism 156. An actuator housing 214 is preferably disposed on the seat support structure 114 and is preferably parallel to the axis of rotation 106. The retaining pin 220 preferably includes a distal end of the retaining pin 216 that is slidably positioned within the actuator housing 214, with actuator housing 214 being configured to bias the distal end of the retaining pin 216 (also referred to in the claims as "a distal pin end") to push outwardly from the actuator housing 214. This may be achieved via a pin biasing spring 218 (also referred to in the claims as "a biasing member") positioned in the actuator housing 214. A second actuator housing may be disposed on the seat support structure, a second retaining pin having a distal end of the second retaining pin 236 (also referred to in the claims as "a distal second pin end") and being slidably positioned within the second actuator housing, a second biasing member (also referred to in the claims as "a second biasing member") being disposed in the second actuator housing configured to bias the distal end of the second retaining pin outwardly from the actuator housing. A second connector 230 may be provided which extends from the second retaining pin 240 to the yoke mechanism 156 such that the second retaining pin 240 can be disengaged from the second indexing plate 170, allowing the back support structure 134 to be pivotally moved relative to the seat support structure 114 by operation of the yoke mechanism 156. A handle 150 may be attached to the connector and the second connector such that operation of the handle disengages both the retaining pin and the second retaining pin so that the back support structure can rotate relative to the seat support structure.

The connector 210 and second connector 230 are preferably formed of taut cables of woven metal, plastic, rope, or the like. The handle 150 is preferably formed of molded plastic, hard rubber, or shaped wood. Those of ordinary skill in the art will appreciate from this disclosure that these elements may be formed of any suitable materials without exceeding the scope of this disclosure.

Preferably, a plurality lock rings 206 and tightening nuts 208 may be provided about the actuator housing 214 on either side of the actuator mounting bracket 188 to better secure the actuator housing 214 to the pair of sandwich plates 180. Similarly, it is preferred that a plurality of lock rings 206 and tightening nuts 208 are provided about the second actuator housing 234 on either side of the second actuator mounting bracket 198 to better secure the second actuator housing 234 to the second pair of sandwich plates 190. All affixing is preferably provided by a plurality of fasteners 200, including screws, nuts, bolts, rivets, washers, or any combination thereof.

Referring to FIGS. 1-27, a preferred embodiment of the present invention operates as follows. A user first provides a chair body 112 in the first compact configuration, with the back support structure 134 being positioned close to the seat support structure 114. The seat cushion 126 may cover the inner seat surface 116 and the back rest cushion 146 may cover the inner back face 136. The post 124 is then placed in a mounting mechanism 108 in the boat decking 103, and one or more fixed connector 202 has been positioned on the bulkhead structure 102 of the boat 100. The chair body 112 is preferably lifted above the top end of the post 124, and then lowered such that the upper end of the post 124 is inserted into the pedestal 122. The pedestal locking pin 222 may then be inserted to lock the post 124 within the pedestal 122. The chair body 112 is preferably turned such that the seat connector 204 is facing the user, then the chair body 112 is turned toward the bulkhead structure 102 so that the seat connector 204 may contact, and then lock into, the one or more fixed connectors 202. The handle 150 is then pulled downward, to remove the distal end of the retaining pin 216 and the distal end of the second retaining pin 236 from the plurality of bores 162 and second plurality of bores 164, respectively. The back support structure 134 may then be tilted away from the seat support structure 114 along the axis of rotation 106 until the desired angle is achieved. The handle 150 may then be released, with the handle biasing spring 158 bringing the handle 150 to abut the handle abutment face 151. The pin biasing spring 218 will then force the distal end of the retaining pin 216 against the disc portion 166 of the indexing plate 160, and the second pin biasing spring 238 will then force the distal end of the second retaining pin 236 against the second disc portion 176 of the second indexing plate 170. The back support structure 134 may then be gently tilted either toward or way from the seat support structure 114 until the distal end of the retaining pin 216 is forced through one of the plurality of bores 162 by the pin biasing spring 218, to lock the chair body 112 into one of the first open configuration, second open configuration, or third open configuration. Simultaneously, the distal end of the second retaining pin 236 is forced through a corresponding one of the second plurality of bores 172 by the second pin biasing spring 238, to lock the chair body 112 into one of the first open configuration, second open configuration, or third open configuration on both lateral sides. Those of ordinary skill in the art will appreciate from this disclosure that the steps may be performed or omitted in any order without exceeding the scope of this disclosure.

In an alternative preferred embodiment of the present invention, the present invention operates as follows. The user first places the freestanding stand 250 on a flat surface. The user then places the post 124 into the stand pedestal 242 and locks the post 124 into the stand pedestal 242 with the stand pedestal locking pin 244. A user next provides a chair body 112 in the first compact configuration, with the back support structure 134 being positioned close to the seat support structure 114. The seat cushion 126 may cover the inner seat surface 116 and the back rest cushion 146 may cover the inner back face 136. The chair body 112 is preferably lifted above the top end of the post 124, and then lowered such that the upper end of the post 124 is inserted into the pedestal 122. The pedestal locking pin 222 may then be inserted to lock the post 124 within the pedestal 122, thus connecting the chair body 112 to the stand pedestal 242 by way of the post 124. The handle 150 is then pulled downward, to remove the distal end of the retaining pin 216 and the distal end of the second retaining pin 236 from the plurality of bores 162 and second plurality of bores 164, respectively. The back support structure 134 may then be tilted away from the seat support structure 114 along the axis of rotation 106 until the desired angle is achieved. The handle 150 may then be released, with the handle biasing spring 158 bringing the handle 150 to abut the handle abutment face 151. The pin biasing spring 218 will then force the distal end of the retaining pin 216 against the disc portion 166 of the indexing plate 160, and the second pin biasing spring 238 will then force the distal end of the second retaining pin 236 against the second disc portion 176 of the second indexing plate 170. The back support structure 134 may then be gently tilted either toward or way from the seat support structure 114 until the distal end of the retaining pin 216 is forced through one of the plurality of bores 162 by the pin biasing spring 218, to lock the chair body 112 into one of the first open configuration, second open configuration, or third open configuration. Simultaneously, the distal end of the second retaining pin 236 is forced through a corresponding one of the second plurality of bores 172 by the second pin biasing spring 238, to lock the chair body 112 into one of the first open configuration, second open configuration, or third open configuration on both lateral sides. The outer frame 248 if the freestanding stand 250 may be adjusted to provide length where needed to stabilize the position of the boat chair 110. The boat chair 110 may then be moved by lifting a end of the outer frame 248 opposite of the wheeled feet 254 and pulling in a direction away from the wheeled feet 254, to allow the boat chair 110 to roll using the wheeled feet 254. Those of ordinary skill in the art will appreciate from this disclosure that the steps may be performed or omitted in any order without exceeding the scope of this disclosure.

It is recognized by those skilled in the art that changes may be made to the above described methods and structures without departing from the broad inventive concept thereof. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A boat chair that is detachably installable on a boat, comprising:
    a chair body which is moveable between a first compact configuration, a first open configuration, and a second open configuration, wherein the chair body is configured for sitting upon when in either of the first open configuration and the second open configuration;
    the chair body comprising a back support structure and a seat support structure which are pivotally connected together about an axis of rotation;
    a retaining pin disposed on the seat support structure is configured to detachably secure an angular position of the back support structure relative to the seat support structure such that the chair body can be secured in either of the first compact configuration, the first open configuration, and the second open configuration, wherein the angular position of the back support structure is different in the second open configuration from the first open configuration;
    wherein the back support structure further includes an indexing plate attached thereto, the indexing plate including a plurality of bores therein configured to receive the retaining pin therein;
    wherein the chair body further comprises an actuator housing disposed on the seat support structure, the retaining pin having a distal pin end and being slidably positioned within the actuator housing, a biasing member being disposed in the actuator housing configured to bias the distal pin end outwardly from the actuator housing; and
    wherein a yoke is disposed along the seat support structure and axially displaced along the axis of rotation from the actuator housing, a connector extending from the retaining pin to the yoke such that the retaining pin can be disengaged from the indexing plate so that the back support structure can be pivotally moved relative to the seat support structure by operation of the yoke.

2. The boat chair of claim 1, wherein no part of the chair body is formed by a bulkhead structure of the boat nor boat decking.

3. The boat chair of claim 2, further comprising a post that is detachably engageable with the seat support structure such that the chair body can be detachably installed on the boat.

4. The boat chair of claim 3, further providing a seat connector disposed on the seat support structure and configured to engage at least one of (1) the bulkhead structure of the boat, and (2) a fixed connector located on the bulkhead structure of the boat.

5. The boat chair of claim 1, wherein the yoke is oriented perpendicularly relative to the axis of rotation and the actuator housing is located parallel to the axis of rotation.

6. The boat chair of claim 5, further comprising a second actuator housing disposed on the seat support structure, a second retaining pin having a distal second pin end of the second retaining pin and being slidably positioned within the second actuator housing, a second biasing member being disposed in the second actuator housing configured to bias the distal second pin end outwardly from the actuator housing.

7. The boat chair of claim 6, wherein the back support structure further includes a second indexing plate attached thereto, the second indexing plate including a second plurality of bores therein configured to receive the second retaining pin therein.

8. The boat chair of claim 7, further comprising a second connector extending from the second retaining pin to the yoke such that the second retaining pin can be disengaged from the second indexing plate so that the back support structure can be pivotally moved relative to the seat support structure by operation of the yoke.

9. The boat chair of claim 8, wherein the yoke further comprises a handle attached to the connector and the second connector such that operation of the handle disengages both the retaining pin and the second retaining pin so that the back support structure can rotate relative to the seat support structure.

10. The boat chair of claim 9, wherein the seat support structure further comprises a pair of sandwich plates have the indexing plate located therebetween.

11. The boat chair of claim 10, further comprising a sandwich spacer between the pair of sandwich plates, a pair of plate bushings being located on each side of the indexing plate and between the pair of sandwich plates.

12. A combination boat chair and freestanding stand, comprising:
    the boat chair of claim 4;
    a free-standing stand configured for placement on a flat surface, the freestanding stand having a post receptacle thereon such that the boat chair can be configured for use in any one of the following conditions: (1) to engage the bulkhead structure of the boat, (2) a fixed connector located on the bulkhead structure of the boat, (3) vertically aligned and positioned over the bulkhead structure and/or boat decking via the post, and (4) vertically aligned and positioned from the freestanding stand via the post such that the boat chair is used separate from the boat.

* * * * *